(12) United States Patent
Liu et al.

(10) Patent No.: US 11,537,241 B2
(45) Date of Patent: Dec. 27, 2022

(54) ULTRASONIC INDUCTION CIRCUIT, DRIVING METHOD THEREOF, DISPLAY DEVICE AND STORAGE MEDIUM

(71) Applicant: BOE Technology Group Co., Ltd., Beijing (CN)

(72) Inventors: Yingming Liu, Beijing (CN); Haisheng Wang, Beijing (CN); Xiaoliang Ding, Beijing (CN); Lei Wang, Beijing (CN); Pengpeng Wang, Beijing (CN); Changfeng Li, Beijing (CN); Xiufeng Li, Beijing (CN); Chenyang Zhang, Beijing (CN); Tianqi Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 53 days.

(21) Appl. No.: 17/265,802

(22) PCT Filed: Jul. 2, 2020

(86) PCT No.: PCT/CN2020/099925
§ 371 (c)(1),
(2) Date: Feb. 3, 2021

(87) PCT Pub. No.: WO2021/000914
PCT Pub. Date: Jan. 7, 2021

(65) Prior Publication Data
US 2021/0165524 A1    Jun. 3, 2021

(30) Foreign Application Priority Data

Jul. 4, 2019    (CN) .......................... 201910599313.6

(51) Int. Cl.
*G06F 3/043* (2006.01)
*G06V 40/13* (2022.01)
(Continued)

(52) U.S. Cl.
CPC .......... *G06F 3/0433* (2013.01); *B06B 1/0238* (2013.01); *B06B 1/0696* (2013.01); *G06V 40/1306* (2022.01)

(58) Field of Classification Search
CPC ......... G06F 3/041; G06F 3/043; G06F 3/0433
(Continued)

(56) References Cited

U.S. PATENT DOCUMENTS 10,838,547 B1 * 11/2020 Shen ...................... G06F 3/0412
2017/0285877 A1 * 10/2017 Hinger ................... G01N 29/26
(Continued)

FOREIGN PATENT DOCUMENTS

CN      106156741 A      11/2016
CN      107131918 A      9/2017
(Continued)

OTHER PUBLICATIONS

Office Action dated Aug. 23, 2021 for Chinese Patent Application No. 201910599313.6 and English Translation.
(Continued)

*Primary Examiner* — Calvin C Ma
(74) *Attorney, Agent, or Firm* — Ling Wu; Stephen Yang; Ling and Yang Intellectual Property

(57) ABSTRACT

An ultrasonic induction circuit is provided, a first electrode of an ultrasonic sensor is electrically connected with a first terminal of the ultrasonic sensing circuit, a second electrode is electrically connected with a second terminal of a first potential supply sub-circuit, and the first terminal of the first potential supply sub-circuit is electrically connected with a first potential supply end. A gate of M1 is electrically connected with the second electrode and the second terminal of the compensation sub-circuit. The second electrode is electrically connected with the first terminal of the compensation sub-circuit. The first electrode is coupled to the second potential supply end. The first terminal of the signal output sub-circuit is electrically connected to the second electrode of the first transistor, and the second terminal is electrically connected to the second terminal of the ultrasonic induction circuit.

15 Claims, 11 Drawing Sheets

(51) Int. Cl.
   *B06B 1/02*   (2006.01)
   *B06B 1/06*   (2006.01)
(58) Field of Classification Search
   USPC .......................................................... 345/177
   See application file for complete search history.

(56) References Cited

U.S. PATENT DOCUMENTS

| | | | |
|---|---|---|---|
| 2018/0225547 A1 | 8/2018 | Kim et al. | |
| 2019/0171860 A1 | 6/2019 | Wu et al. | |
| 2020/0142581 A1* | 5/2020 | Li ....................... | G02F 1/13306 |
| 2021/0019018 A1 | 1/2021 | Guo et al. | |

FOREIGN PATENT DOCUMENTS

| | | |
|---|---|---|
| CN | 108418463 A | 8/2018 |
| CN | 108596160 A | 9/2018 |
| CN | 108806587 A | 11/2018 |
| CN | 108883435 A | 11/2018 |
| CN | 109829419 A | 5/2019 |

OTHER PUBLICATIONS

International Search Report for PCT/CN2020/099925 dated Sep. 30, 2020.

\* cited by examiner

ULTRASONIC INDUCTION CIRCUIT, DRIVING METHOD THEREOF, DISPLAY DEVICE AND STORAGE MEDIUM

The present application claims the priority of Chinese patent application No. 201910599313.6, filed to the CNIPA on Jul. 4, 2019 and entitled "Ultrasonic Induction Circuit, Driving Method Thereof and Display Device", the content of which should be regarded as being incorporated herein by reference.

TECHNICAL FIELD

Embodiments of the disclosure relate to but are not limited to the fields of display technology and touch control technology, and in particular to an ultrasonic induction circuit and a driving method thereof, a display device and a computer-readable storage medium.

BACKGROUND

With the development and widespread use of display technology, the integration of devices with touch functions in display devices is where new display devices are heading.

Current touch devices integrated in display devices have fingerprint recognition function and touch operation function for example, and the touch devices usually adopted are capacitive or resistive touch devices. In addition, there is a touch device that uses an ultrasonic sensor to implement fingerprint recognition and touch operation. In the circuit of ultrasonic sensor with touch function, there is a problem that the touch performance being affected due to the error occurred when fingerprint ridges and valleys are determined.

SUMMARY

The following is a summary of subject matter described in detail herein. This summary is not intended to limit the protection scope of the claims.

The embodiments of the disclosure provide an ultrasonic induction circuit and a driving method thereof, a display device and a computer-readable storage medium.

In one aspect, the embodiments of the disclosure provide an ultrasonic induction circuit having an ultrasonic sensor, a first potential supply sub-circuit, a first transistor, a compensation sub-circuit and a signal output sub-circuit;

the ultrasonic sensor comprises a first electrode, a second electrode and a piezoelectric film layer arranged between the first electrode and the second electrode. The first electrode is electrically connected with a first terminal of the ultrasonic induction circuit. The second electrode is electrically connected with a second terminal of the first potential supply sub-circuit. A first terminal of the first potential supply sub-circuit is electrically connected with a first potential supply end;

a gate of the first transistor is electrically connected with the second electrode and a second terminal of the compensation sub-circuit. A second electrode of the first transistor is electrically connected with a first terminal of the compensation sub-circuit. A first electrode of the first transistor is coupled to a second potential supply end;

a first terminal of the signal output sub-circuit is electrically connected to the second electrode of the first transistor, and a second terminal thereof is electrically connected to a second terminal of the ultrasonic induction circuit.

In some possible implementations, in the ultrasonic induction circuit as described above, the first potential supply sub-circuit includes:

a second transistor, a second electrode of the second transistor being electrically connected to the second electrode, a first electrode of the second transistor being electrically connected to the first potential supply end, and a gate of the second transistor being electrically connected to a switch terminal of the second transistor, or a first diode, a second electrode of the first diode being electrically connected to the second electrode, a first electrode of the first diode being electrically connected to the first potential supply terminal, or a second transistor and a first diode connected in parallel, a second electrode of the second transistor and a second electrode of the first diode being electrically connected to the second electrode respectively, a first electrode of the second transistor and a first electrode of the first diode being electrically connected to the first potential supply end respectively, and a gate of the second transistor being electrically connected to the switch terminal of the second transistor.

In some possible implementations, in the ultrasonic induction circuit as described above, the compensation sub-circuit includes a third transistor, a first electrode of the third transistor being electrically connected with the second electrode of the first transistor, a second electrode of the third transistor being electrically connected with the gate of the first transistor, and a gate of the third transistor being electrically connected to a switch end of the third transistor, or a second diode, a first electrode of the second diode being electrically connected with the second electrode of the first transistor, and the second electrode of the second diode being electrically connected to the gate of the first transistor, or a third transistor and a second diode connected in series, a first electrode of the third transistor being electrically connected with the second electrode of the first transistor, a second electrode of the third transistor being electrically connected with a first electrode of the second diode, the second electrode of the second diode being electrically connected with the gate of the first transistor, and the gate of the third diode electrically connected to the switch terminal of the third transistor.

In some possible implementations, the ultrasonic induction circuit as described above further includes a power supply sub-circuit, a second terminal of the power supply sub-circuit being electrically connected with the first electrode of the first transistor, and a first terminal of the power supply sub-circuit being electrically connected to the second potential supply end.

In some possible implementations, in the ultrasonic induction circuit as described above, the power supply sub-circuit includes a fourth transistor and a fifth transistor, a second electrode of the fourth transistor and a second electrode of the fifth transistor being electrically connected to the first electrode of the first transistor, a first electrode of the fourth transistor being electrically connected to the second potential supply end, a gate of the fourth transistor being electrically connected to a switch terminal of the fourth or a switch terminal of a third transistor, a first electrode of the fifth transistor being electrically connected to a power supply voltage terminal, and a gate of the fifth transistor being electrically connected to a switch terminal of the fifth transistor, or or a fifth transistor, a second electrode of the fifth transistor being electrically connected to the first electrode of the first transistor, a first electrode of the fifth transistor being electrically connected to the second potential supply terminal of a shared port, and a gate of the fifth transistor being electrically connected to the switch terminal of the fifth transistor.

In some possible implementations, in the ultrasonic induction circuit as described above, the signal output sub-circuit includes a sixth transistor, a first electrode of the sixth transistor being electrically connected to the second electrode of the first transistor, a second electrode of the sixth transistor being electrically connected to the second terminal of the ultrasonic induction circuit, and a gate of the sixth transistor being electrically connected to the switch terminal of the sixth transistor.

In another aspect, the embodiments of the present disclosure also provide a driving method for the ultrasonic induction circuit which is implemented by using the ultrasonic induction circuit as described in any one of the above, and the driving method includes the following acts:

supplying a first fixed potential to the second electrode of the ultrasonic sensor by the first potential supply sub-circuit, sending a preset alternating current signal via the first electrode when a voltage of the second electrode of the ultrasonic sensor is the first fixed potential, so that the ultrasonic sensor emits ultrasonic waves; supplying a second fixed potential to the second electrode by the first transistor and the compensation sub-circuit; when receiving ultrasonic waves that return after reaching a user's finger, converting, by the ultrasonic sensor, the received ultrasonic waves into voltage signals and outputting the voltage signals via the signal output sub-circuit.

In some possible implementations, in the driving method for the ultrasonic induction circuit as described above, the magnitude of the second fixed potential is a result that the fixed potential provided by the second potential supply terminal minus the threshold voltage of the first transistor.

In some possible implementations, in the driving method for the ultrasonic induction circuit as described above, the current of the voltage signals converted from the received ultrasonic waves is:

$$I = \frac{1}{2}\mu_n C_{ox} \frac{W}{L}(V_{GS} - V_{r2}),$$

$\mu_n$ is a mobility of the first transistor channel, $C_{ox}$ is a capacitance of the first transistor, $$\frac{W}{L}$$

is a width-length ratio of the first transistor, $V_{GS}$ is a voltage between the gate and the second electrode of the first transistor, and $V_{r2}$ is the second fixed potential.

In some possible implementations, in the driving method for the ultrasonic induction circuit described above, the act of providing a first fixed potential to the second electrode of the ultrasonic sensor via the first potential supply sub-circuit includes turning on the first potential supply sub-circuit, and turning off the first transistor, the compensation sub-circuit and the signal output sub-circuit, so as to supply the first fixed potential to the second electrode via the first potential supply terminal that is electrically connected with the first potential supply sub-circuit.

In some possible implementations, in the driving method for the ultrasonic induction circuit described above, the act of providing a second fixed potential to the second electrode via the first transistor and the compensation sub-circuit includes turning on the first transistor and the compensation sub-circuit, and turning off the first potential supply sub-circuit and the signal output sub-circuit, so as to supply the second fixed potential to the second electrode via the second potential supply terminal that is electrically connected with the first transistor.

In some possible implementations, in the driving method for the ultrasonic induction circuit described above, the act that the ultrasonic sensor receiving ultrasonic waves that return after reaching a user's finger includes sampling the received ultrasonic waves after increasing the second fixed potential to a third fixed potential through the first transistor and the compensation sub-circuit, and after finishing the sampling, decreasing the third fixed potential to a fourth fixed potential, the fourth fixed potential being the static working potential of the first transistor.

In some possible implementations, in the driving method for the ultrasonic induction circuit as described above, act that the ultrasonic sensor converts the received ultrasonic waves into voltage signals and outputs the voltage signals through the signal output sub-circuit includes converting the received ultrasonic waves into the voltage signals after the received ultrasonic waves passing through the piezoelectric film layer of the ultrasonic sensor, turning on the signal output sub-circuit and the first transistor, turning off the first potential supply sub-circuit and the compensation sub-circuit, and outputting, through the first transistor and the signal output sub-circuit, voltage signals reaching the gate of the first transistor.

In another aspect, the embodiments of the present disclosure also provide a display device which includes a display panel and an ultrasonic induction circuit arranged in an array according to any one of the above.

In some possible implementations, in the display device as described above, the ultrasonic sensor of the ultrasonic induction circuit is disposed on a backplane attached to the display panel. A side of the backplane facing away from the display panel is sequentially provided with the second electrode, the piezoelectric film layer and the first electrode arranged in an array.

In another aspect, the embodiments of the present disclosure further provide a computer-readable storage medium in which executable instructions are stored. When the executable instructions are executed by a processor, the driving method for the display panel as described in any one of the above is implemented.

Other aspects will become apparent upon reading and understanding accompanying drawings and the detailed description.

BRIEF DESCRIPTION OF DRAWINGS

Accompanying drawings are for furthering the understanding of technical schemes of the present disclosure, form a part of the description and explain the technical schemes of the present disclosure in conjunction with the embodiments of the present disclosure, while they do not constitute any limitation on the technical schemes of the present disclosure.

DETAILED DESCRIPTION

Figure 1:
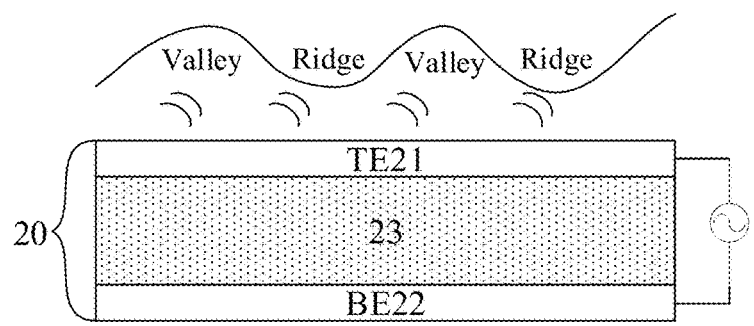
FIG. 1 is a schematic diagram of the structure and principle of an ultrasonic generator.

The embodiments herein may be implemented in a number of different forms. A person of ordinary skills in the art will readily understand the fact that implementations and contents may be transformed into a variety of forms without departing from the spirit and scope of the present disclosure. Therefore, the present disclosure should not be construed as being limited only to what is described in the following embodiments. Without conflict, embodiments in the present disclosure and features in the embodiments may be combined with each other arbitrarily.

The steps shown in a flowchart of the drawings may be performed in a computer system in which a set of computers can execute instructions. Moreover, although a logical sequence is shown in the flowchart, in some cases, the steps shown or described may be performed in a sequence different from that shown.

The drawings may sometimes exaggerate to illustrate a size of a constituent element, a thickness or an area of a layer for clarity. Therefore, any implementation of the present disclosure is not necessarily limited to the dimensions illustrated in the drawings. The shapes and sizes of components in the drawings do not reflect real proportion. In addition, the drawings schematically illustrate ideal examples, and any implementation of the present disclosure is not limited to the shapes, values or the like illustrated in the drawings.

The ordinal numbers such as "first", "second", "third", etc. in the present disclosure are used for avoiding confusion of constituent elements rather than providing any quantitative limitations.

In the present specification, for convenience, words indicating orientation or positional relationship such as "middle", "upper", "lower", "front", "rear", "vertical", "horizontal", "top", "bottom", "inside" and "outside" or the like are used to explain the positional relationship of constituent elements with reference to the drawings. These words are only for an easy and simplified description of the implementations, rather than indicating or implying that a device or an element referred to must have a specific orientation or must be constructed or operated in a particular orientation. Therefore, these words should not be interpreted as any limitation on the present disclosure. The positional relationship of the constituent elements may be changed appropriately according to the direction of the constituent elements described. Therefore, the words for such positional relationships are not limited to those specified in the present description and may be replaced appropriately according to specific circumstances.

In the present description, terms "installed", "connected" and "coupled" shall be understood in their broadest sense unless otherwise explicitly specified and defined. For example, it may be fixedly connected, or may be removable connected, or integrally connected; it may be mechanically connected, or may be electrically connected; it may be directly connected, or may be indirectly connected through middleware, or may be internal connection between two elements. Those of ordinary skill in the art can understand the specific meanings of the above mentioned terms in the present disclosure according to specific situations.

In the present disclosure, a transistor refers to an element including at least three terminals i.e. a gate electrode, a drain electrode and a source electrode. A transistor has a channel region between a drain electrode (or referred to as a drain electrode terminal, a drain region or drain electrode) and a source electrode (or referred to as a source electrode terminal, a source region or a source electrode), and a current can flow through the drain electrode, channel region and source electrode. In the present disclosure, the channel region refers to a region through which a current mainly flows.

In the present description, a first electrode may be a drain electrode and a second electrode may be a source electrode, or a first electrode may be a source electrode and a second electrode may be a drain electrode. The function of a "source electrode" and that of a "drain electrode" are sometimes interchangeable under the circumstance where transistors with opposite polarities are used or where the current direction changes during circuit operation. Therefore, in the present disclosure, a "source electrode" and a "drain electrode" are interchangeable.

In the present specification, "(being) electrically connected" includes a circumstance where the constituent elements are connected via an element having a certain electrical function. The "element having a certain electrical function" is not particularly limited as long as it can transmit and receive electrical signals between the constituent elements connected. Examples of "element having a certain electrical action" can include an electrode, a wiring, a switching element such as a transistor, or other functional elements such as a resistor, an inductor or a capacitor.

In the current ultrasonic sensor circuits with touch functions, because a voltage signal output by the whole ultrasonic sensor circuit will be affected by a threshold voltage ($V_{th}$) of a transistor on the output path of the circuit, and in addition, because in a plurality of touch units (i.e. ultrasonic sensors) configured in display device, the threshold voltage of the transistors on the aforementioned output path is related with their manufacturing process, temperature and other factors. Thus, the threshold voltage of the transistor on the output path will affect the voltage signal used for implementing touch operation, thereby resulting in errors occurred in the determination of the ridges and valleys and the touch performance will be affected.

FIG. 1 is a schematic diagram of the structure and principle of an ultrasonic generator. As shown in FIG. 1, an ultrasonic generator 20 may include a Top Electrode (TE) 21, a Bottom Electrode (BE) 22 and a piezoelectric layer 23 disposed between TE 21 and BE 22. By inputting an Alternating Current (AC) voltage to TE 21 and BE 22, for example, BE 22 is connected to the ground terminal (GND) to give a fixed potential and AC square wave is input via TE 21, the piezoelectric layer 23 will be deformed or will drive the substrates of the upper and lower electrodes to vibrate and thereby generate sound waves and transmit the sound waves. If there is an air cavity below the ultrasonic generator 20, the sound waves may be enhanced and transmitted better. In the ultrasonic generator 20 as described above, the electrode (e.g., TE 21) used for inputting the AC square waves may be considered as a Transport electrode (Tx).

Figure 2:
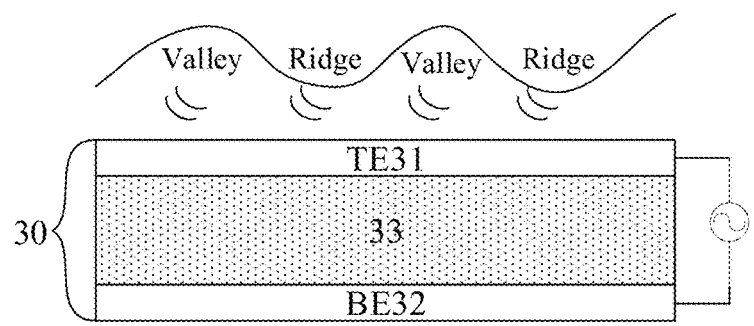
FIG. 2 is a schematic diagram of the structure and principle of an ultrasonic receiver.

FIG. 2 is a schematic diagram of the structure and principle of an ultrasonic receiver. As shown in FIG. 2, an ultrasonic receiver 30 may also include a Top Electrode (TE) 31 and a Bottom Electrode (BE) 32, and a piezoelectric layer 33 disposed between TE 31 and BE 32. The ultrasonic receiver 30 as described above may receive ultrasonic waves transmitted by other devices or equipment and ultrasonic waves reflected by user's fingers after being transmitted. For example, TE 31 is a fixed electrode, and BE 32 is an ultrasonic wave receiving electrode. When the sound waves reach the piezoelectric layer 33 of the ultrasonic receiver 30, the received ultrasonic waves will be converted into AC voltage signals, and then BE 35 may access the AC voltage signals output by the piezoelectric layer 33. Because the voltage signals are different due to the energies reflected by the ridges and valleys of fingers are different. In the ultrasonic receiver 30 as described above, the electrode (e.g., BE 32) for outputting a voltage signal may be considered as a Receive electrode (Rx).

The materials of the piezoelectric layer 23 in FIG. 1 and the piezoelectric layer 33 in FIG. 2 are copolymer, examples of which may be polyvinylidene fluoride (PVDF) film piezoelectric materials, or may be other inorganic or organic piezoelectric materials such as aluminum nitride (AlN), lead zirconate-titanate (PZT) and zinc oxide (ZnO).

Figure 3:
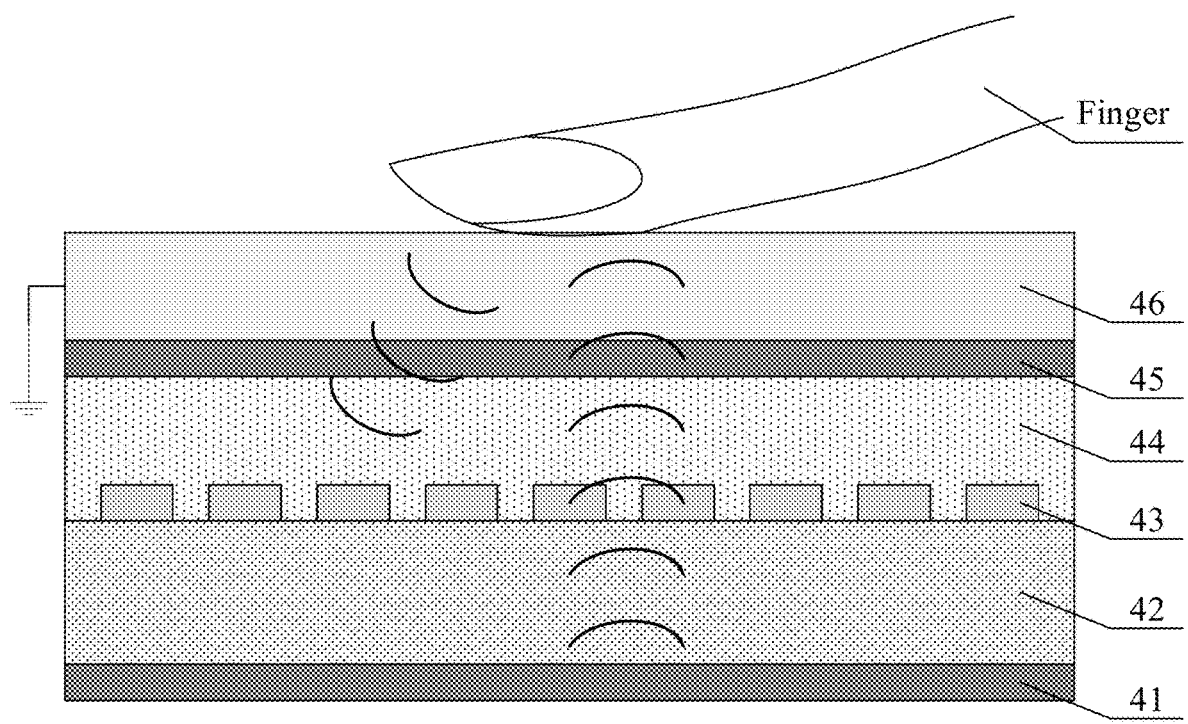
FIG. 3 is a schematic diagram of the structure and principle of an ultrasonic sensor.

FIG. 3 is a schematic diagram of the structure and principle of an ultrasonic sensor. In FIG. 3, the ultrasonic generator 20 shown in FIG. 1 and the ultrasonic receiver 30 shown in FIG. 2 are combined into one device. The ultrasonic sensor 40 schematically illustrated in FIG. 3 may include a Tx 41, a Thin Film Transistor (TFT) substrate 42, a Rx 43, a piezoelectric layer 44, a fixed electrode 45 and a touch panel 46, which are arranged sequentially from the end far from a user's touch to the end close to a user's touch. The working principle of the ultrasonic sensor 40 described above is as follows: in a transmitting stage, AC voltage is input between the fixed electrode 45 and the Tx 41, so that the piezoelectric layer 44 generates and transmits ultrasonic waves, while in a receiving stage, a voltage is applied between the fixed electrode 45 and the Rx 43, and the piezoelectric layer 44 converts the received ultrasonic waves into AC voltage which is then output through the Rx 43. The ultrasonic waves transmitted by the Tx 41 reach ridges or valleys of the user's finger. Because the ridge and the valley of the user's finger have different reflectivities, and the energy reflected by the valley is stronger relatively. In this way, ridges and valleys are distinguished by voltage signals of different intensities.

Figure 4:
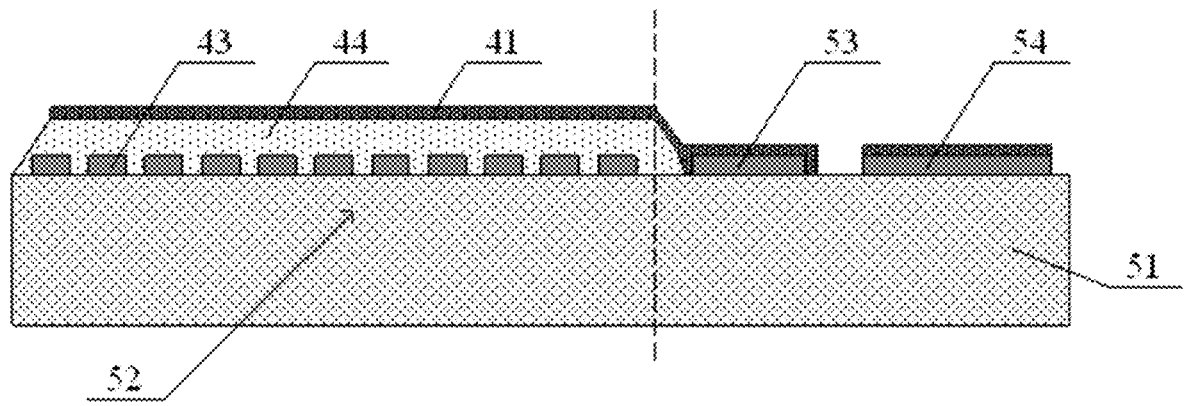
FIG. 4 is a schematic diagram of an ultrasonic sensor and pixel structure.

FIG. 3 is taken as an example to explain the basic principle of how the transmitting and receiving of ultrasonic waves are implemented. The Transport electrode (Tx) 41 and the Receive electrode (Rx) 43 can be fabricated on a glass substrate, i.e. the Receive electrode (Rx) 43 is fabricated on the glass substrate as well. FIG. 4 is a schematic diagram of an ultrasonic sensor and a pixel structure. A pixel structure 50 of a display panel may include a TFT substrate 51, a pixel active area 52, an Rbias ITO 53 and a flexible printed circuit on glass (FOG) module 54. Rbias indicates a bias voltage, and bias voltage (Rbias) wires can be made of Indium tin oxide (ITO) and thus is expressed as Rbias ITO. The receiving electrode (Rx) 43 and the piezoelectric layer 44 of the ultrasonic sensor can be sequentially arranged upon the pixel active area 52. Transport electrode (Tx) 41 covers the piezoelectric layer 44, the Rbias ITO 53 and the FOG 54. As is seen from FIG. 4, the Transport electrode (Tx) 41 and the Receive electrode (Rx) 43 are fabricated on the same side of the TFT substrate 51.

The embodiments provided by the present disclosure can be combined, and the same or similar concepts or processes may not be repeated in the description of some embodiments.

Figure 5:
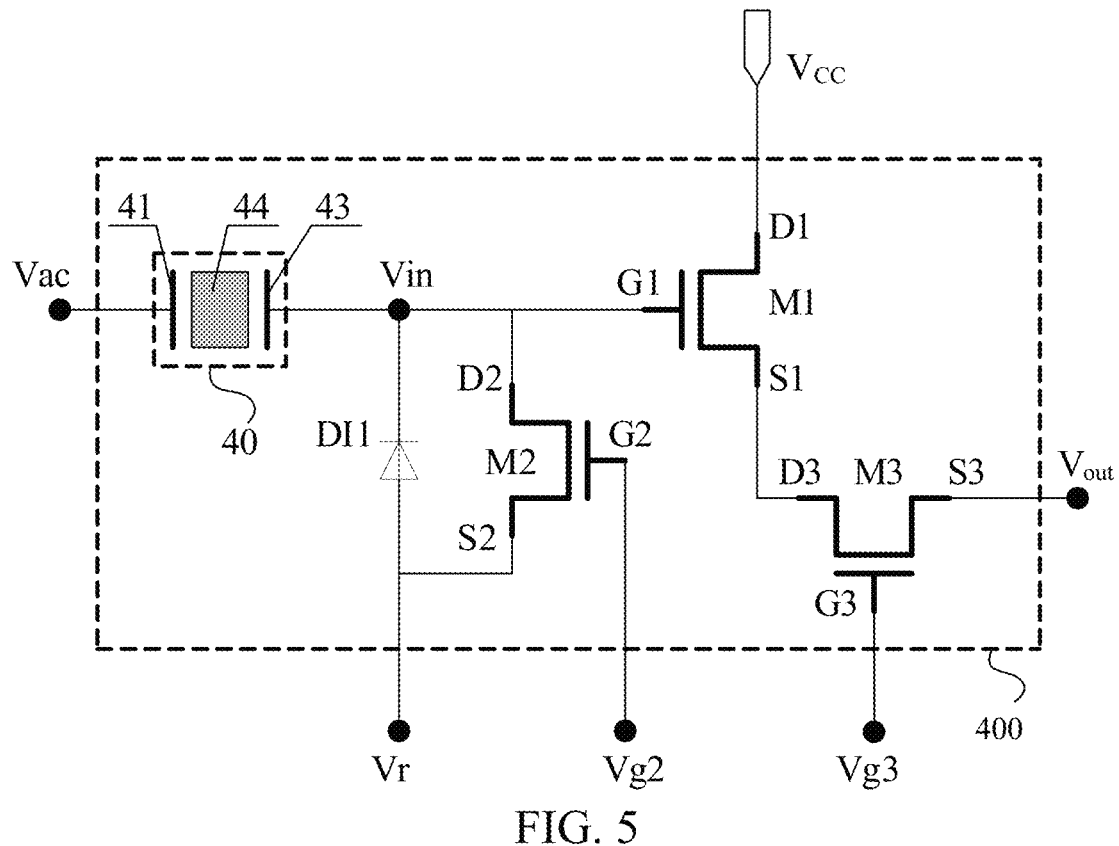
FIG. 5 is a schematic structural diagram of an ultrasonic induction circuit.

FIG. 5 is a schematic structural diagram of an ultrasonic induction circuit based on the principle about transmitting and receiving in the ultrasonic sensor shown in FIGS. 1-4. The ultrasonic induction circuit 400 shown in FIG. 5 includes an ultrasonic sensor 40, a transistor M1, a transistor M2, a transistor M3 and a diode DI1. A gate G1 of M1 is electrically connected with a second electrode 43 (for example, a R(x) 43) of the ultrasonic sensor 40. A first electrode D1 of M1 is electrically connected to a power supply voltage $V_{CC}$. A second electrode S1 of M1 is electrically connected with a first electrode D3 of M3. The above M2 and DI1 are connected in parallel, and a second electrode of S2 of M2 and a second electrode of DI1 (e.g. a cathode of DI1) are respectively electrically connected to the second electrode 43. A first electrode D2 of M2 and a first electrode of DI1 (e.g. an anode of DI1) are respectively electrically connected to the fixed potential Vr. In addition, a gate G2 of M2 is electrically connected to the first switching potential Vg2. A gate G3 of M3 is electrically connected to the second switching potential Vg3. A second electrode S3 of M3 is an output terminal $V_{out}$ of the ultrasonic induction circuit 400. A first electrode 41 of the ultrasonic sensor 40 is used for inputting AC voltage signal Vac. A potential of a node Vin in FIG. 5 is a potential of the second electrode 43 of the ultrasonic sensor 40.

The ultrasonic induction circuit 400 shown in FIG. 5 with the structure shown in FIG. 4 can be applied to a display panel, i.e. a plurality of ultrasonic induction circuits 40, in which one is shown in FIG. 5, are configured in the display panel. The working process of the ultrasonic induction circuit 400 in the display panel may include the following stages:

A first stage (a transmission stage): M2 is turned on, and a fixed potential, for example, V0, is provided to Node Vin via Vr. Then all Node Vins in the pixel area of the display panel are at a fixed potential V0, i.e. the potential of the second electrode 43 of the ultrasonic sensor 40. During the process, M2 can be kept turned on all the time, and signals are kept to be supplied via Vr. Alternatively, M2 is turned off, and Vr may be kept to be supplied signals which provides a fixed potential V0 to Node Vin via DI1. In a case of leakage at Node Vin, Vr can supplement signal to Node Vin via DI1 at any time. At this stage, a requirement is to ensure that the potential at Node Vin is kept at a fixed potential V0. In a situation that the potential at Node Vin is kept at the fixed potential V0, a high voltage square wave or sine wave is input via the first electrode 41 to make the piezoelectric layer 44 to transmit ultrasonic signals. In the ultrasonic wave transmission stage, the second electrode 43 is a fixed potential terminal, and the first electrode 41 is a Transport electrode (Tx).

A second stage (after the end of transmission): the first electrode 41 is given a fixed potential, and the potential at Node Vin is kept at a fixed potential V0. Because A plurality of ultrasonic waves will be reflected when the ultrasonic signals pass through a plurality of films (including the ultrasonic sensor 40 and the plurality of films of the display panel), and these reflected signals are undesired noises, therefore the fixed potential of Node Vin will rise from V0 to V0". Because there existing uncontrollable variation about V0", so that it will cause the potential differences among different Node Vins (i.e. the Node Vins of different ultrasonic sensing circuits 400) in the pixel area of the display panel.

Aiming at the problem mentioned above, i.e., the problem that before receiving ultrasonic signals, the potentials of different Node Vins in the pixel area of the display panel are V0", which causes potential differences among Node Vins. The problem can be solved in the following stage:

A third stage (a pre-reception preparation stage): after the ultrasonic signals are reflected back through a plurality of films and the user's finger interface, and before the signals reach the piezoelectric layer 44 again, the Vr potential terminal can supply the Node Vins via DI1 with a potential which is higher relative to V0, for example V1, and V1>V0. Then, the diode DI1 is turned on, the potential of the Node Vins rise to V1 due to V0", so that all Node Vins in the display panel are kept at a reference potential Vreset (i.e. V1) before the ultrasonic signals are received.

The fourth stage (a reception and output stage): the terminal voltage of Vr potential will be decreased further, so that the potential V1 of Node Vins will be reduced to V1" with Vr. Due to the difference between ridges and valleys of the user's finger, different Node Vins in different display panels (i.e. the Node Vins of the different ultrasonic induction circuits 400) will be caused to have different V1", therefore, the gates G1 of different M1 in the display panel have different potentials. In a case that $V_{cc}$ in ultrasonic induction circuits 400 are the same, in each ultrasonic induction circuit 400, the potential of the gate G1 of the M1 inside the circuit directly decides the voltage output $V_{out}$. In the ultrasonic wave receiving stage, the first electrode 41 is a fixed potential terminal, and the second electrode 43 is a Receive electrode (Rx).

Figure 6:
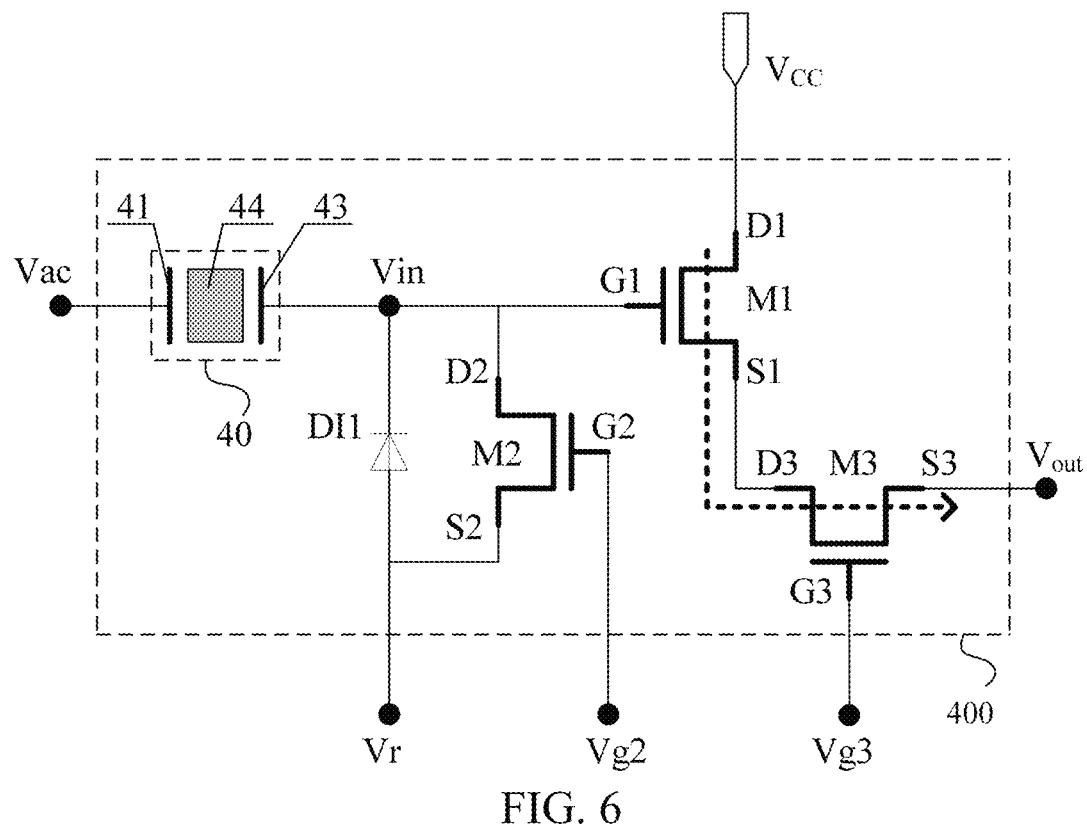
FIG. 6 is a schematic diagram of the principle of the ultrasonic induction circuit shown in FIG. 5 at the voltage signal output stage.

The structure of the ultrasonic induction circuit 400 shown in FIG. 5 has the following problems: due to factors such as its manufacturing process and temperature, a source follower of the transistor M1 will cause transistors M1 to have different threshold voltages Vth from others. Then, in a case that the $V_{CC}$ are the same, the output $V_{out}$ will be affected by the threshold voltage Vth of the transistor M1, resulting in erroneous identification of the ridges and valleys of the user's finger. The principle that the output $V_{out}$ is affected by the threshold voltage $V_{th}$ of the transistor M1 is described as follows. What is shown in FIG. 6 is a schematic diagram of the principle of the ultrasonic induction circuit shown in FIG. 5 at the voltage signal output stage. FIG. 6 illustrates the current direction of the output voltage signals with a bold black dotted line, that is, the voltage value of the output voltage signal $V_{out}$ can be expressed as:

$$V_{out}=I*R; \qquad (1)$$

In the above formula (1), I is the current of the output voltage signals, and R is a resistance value at a back terminal of the transistor M1;

In addition, in the above formula (1), $$I = \frac{1}{2}\mu_n C_{ox} \frac{W}{L}(V_{GS} - V_{th})^2; \qquad (2)$$

In the above formula (2), $\mu_n$ is the mobility of the channel of transistor M1. $C_{ox}$ is the capacitance of transistor M1.

$$\frac{W}{L}$$

is the width-length ratio of the channel of transistor M1, $V_{GS}$ is the voltage between the gate G1 and the second electrode S1 of transistor M1. $V_{th}$ is the threshold voltage of transistor M1.

According to the above calculation principle of $V_{out}$ and I, due to the difference in $V_{th}$ of transistor M1, the value of I is not only related to the value of $V_{GS}$, but also affected by $V_{th}$. Thus, the ridges and valleys of the user's finger are caused by different factors, which affect the detection of ultrasonic signals reflected by the ridges and valleys.

Aiming at the problem of the erroneous identification of the ridges and valleys of the user's finger, caused by the difference in Vth of the transistor M1, in the ultrasonic induction circuit 400 shown in FIGS. 5 and 6, an embodiment of the present disclosure provides an ultrasonic induction circuit with a structure described below in order to eliminate the influence of Vth of transistor M1 on touch operation in the ultrasonic induction circuit 400.

Figure 7:
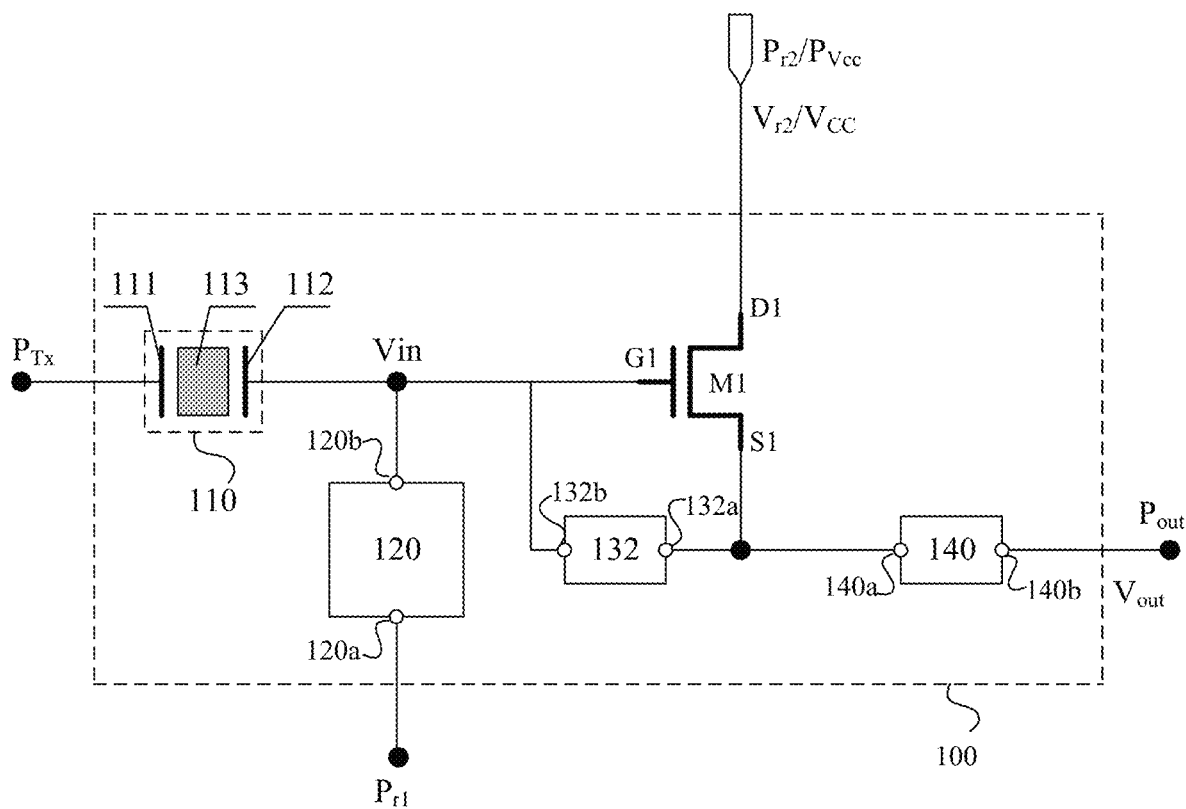
FIG. 7 is a schematic structural diagram of an ultrasonic induction circuit provided by an embodiment of the present disclosure.

FIG. 7 is a schematic structural diagram of an ultrasonic induction circuit provided by an embodiment of the present disclosure. The ultrasonic induction circuit 100 provided in the embodiment may include an ultrasonic sensor 110, a first potential supply sub-circuit 120, a first transistor (hereinafter referred to as "M1"), a compensation sub-circuit 132 and a signal output sub-circuit 140.

In the ultrasonic induction circuit 100 of the embodiment of the present disclosure, the ultrasonic sensor 110 may include a first electrode 111, a second electrode 112, and a piezoelectric film layer 113 disposed between the first electrode 111 and the second electrode 112. The first electrode 111 of the ultrasonic sensor 110 is electrically connected with a first terminal $P_{Tx}$ of the ultrasonic induction circuit 100. The second electrode 112 is electrically connected with a second terminal 120b of the first potential supply sub-circuit 120. The first terminal 120a of the first potential supply sub-circuit 120 is electrically connected to a first potential supply terminal $P_{r1}$. In the above ultrasonic induction circuit 100, the first terminal $P_{Tx}$ of the ultrasonic induction circuit 100 is a signal transmitting terminal outputting ultrasonic signals $V_{Tx}$ in the transmission stage of the ultrasonic sensor 110. The first potential supply terminal $P_{r1}$ may supply a fixed potential $V_{r1}$ to the Node Vin in FIG. 7 (i.e. the second electrode 112) in the transmission stage of the ultrasonic sensor 110.

In the ultrasonic induction circuit 100 of the embodiment of the present disclosure, a gate G1 of M1 is electrically connected with the second electrode 112 and a second terminal 132b of the compensation sub-circuit 132. A second electrode S1 of M1 is electrically connected with a first terminal 132a of the compensation sub-circuit 132. The first electrode D1 of M1 is coupled to a second potential supply terminal $P_{r2}$. The compensation sub-circuit 132 has unidirectional conductivity, meaning that a current can only be input from its first terminal 132a and be output from its second terminal 132b. In the ultrasonic induction circuit 100, the second potential supply terminal $P_{r2}$ may be used as a power supply voltage terminal $P_{Vcc}$, that is, the second potential supply terminal $P_{r2}$ may be used as a shared port with the power supply voltage terminal $P_{Vcc}$. When the shared port is used as the power supply voltage terminal $P_{Vcc}$, the shared port may supply power voltage $V_{CC}$ to the ultrasonic induction circuit 100 in working state. When the shared port is used as the second potential supply terminal $P_{r2}$, the shared port may supply another fixed potential to the Node Vin in FIG. 7 (the second electrode 112) after the ultrasonic sensor 110 finishes a transmission and during a reception stage, and the fixed potential is related to the fixed potential $V_{r2}$ supplied by the second potential supply terminal $P_{r2}$ and to the threshold voltage $V_{th}$ of M1.

In the ultrasonic induction circuit 100, the second potential supply terminal $P_{r2}$ coupled to the first electrode D1 of M1 is a port shared with the power supply voltage terminal $P_{Vcc}$, as described above, the shared port may implement different functions in different working stages of the ultrasonic induction circuit 100. Optionally, this shared port (i.e., shared by the second potential supply terminal $P_{r2}$ and the power supply voltage terminal $P_{Vcc}$) may be split into two independent ports.

In the ultrasonic induction circuit 100 of the embodiment of the present disclosure, a first terminal 140a of the signal output sub-circuit 140 is electrically connected to the second electrode S1 of M1. A second terminal 140b is electrically connected to a second terminal Pt of the ultrasonic induction circuit 100. The second terminal $P_{out}$ is an output terminal of the ultrasonic induction circuit 100 for outputting the voltage signals $V_{out}$ received and converted by the ultrasonic sensor 110.

Based on the structure of the ultrasonic induction circuit 100 shown in FIG. 7, the working process of the ultrasonic induction circuit 100 in the embodiment of the disclosure may include the following stages:

A first stage (a transmission stage): when the first potential supply sub-circuit 120 is turned on, a fixed potential $V_{r1}$ is supplied to Node Vin via $P_{r1}$ while an AC voltage $V_{Tx}$ which is, for example, a high-voltage square wave or sine wave signal, is supplied to the first electrode 111 via $P_{Tx}$, then ultrasonic waves are transmitted. In the above transmission stage, the second electrode 112 is a fixed potential terminal, and the first electrode 111 is a Transport electrode (Tx).

Figure 8:
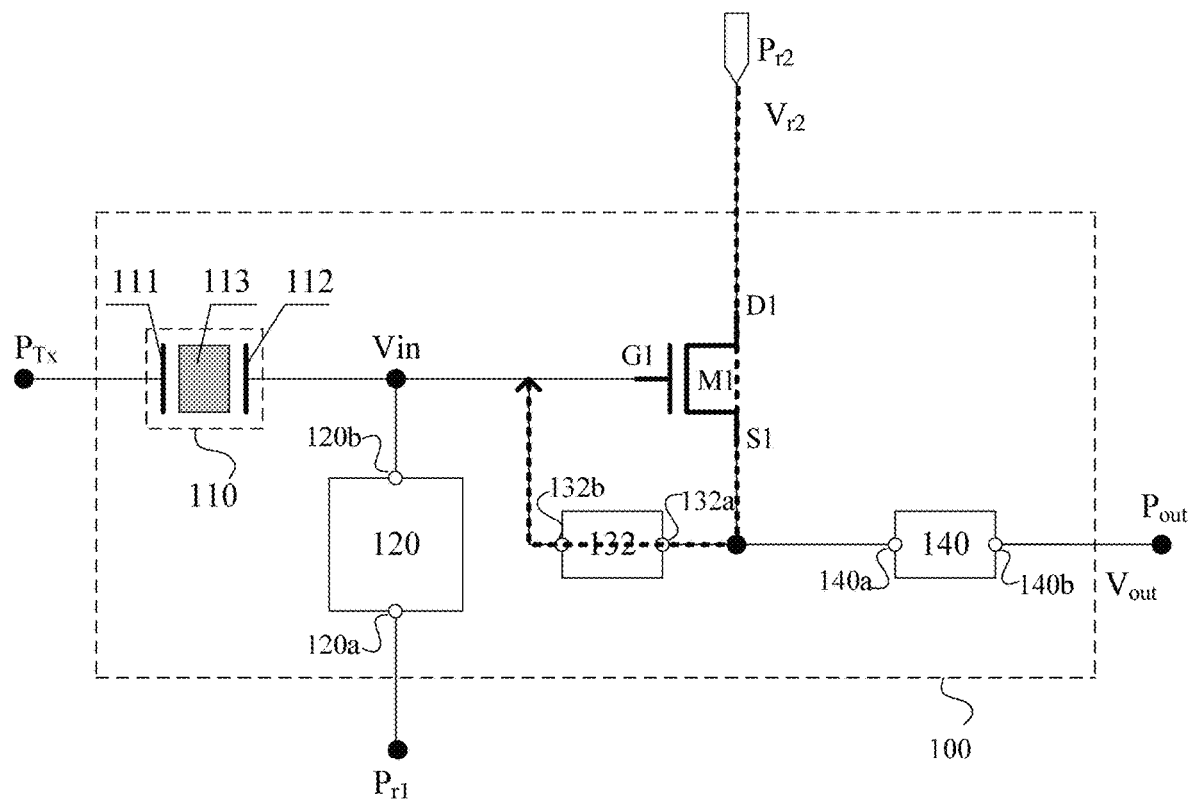
FIG. 8 is a schematic diagram of the working principle of the ultrasonic induction circuit provided by the embodiment illustrated in FIG. 7 before receiving ultrasonic signals.

A second stage (before a reception of the reflected ultrasonic waves): this second stage is a time period after the first stage and before the ultrasonic signal is reflected from the user's finger. M1 and the compensation sub-circuit 132 may be turned on and because the compensation sub-circuit 132 has unidirectional conductivity, that is, in this second stage, the potential $V_{r2}$ supplied by the second potential supply terminal $P_{r2}$ first passes through the first electrode D1 and the second electrode S1 of M1, and then reaches Node Vin via the compensation sub-circuit 132. FIG. 8 is a schematic diagram of the working principle of the ultrasonic induction circuit provided in the embodiment shown in FIG. 7 before receiving the ultrasonic signal. In FIG. 8 the dotted line in boldface illustrates the current direction when a fixed potential is supplied to Node Vin via the second potential supply terminal $P_{r2}$ in this stage. At this stage, the above-mentioned shared port serves as the second potential supply terminal $P_{r2}$ and supplies a fixed potential $V_{r2}$. It may be seen that the fixed potential provided by M1 and the compensation sub-circuit 132 to Node Vin may be $V_{r2}-V_{th}$, $V_{th}$ being the threshold voltage of M1. The supplied fixed potential $V_{r2}-V_{th}$ at this stage is similar to the reference potential Vreset (i.e., V1) of the ultrasonic induction circuit 400 shown in FIG. 5 before reception of the ultrasonic signals and in the ultrasonic wave reception stage, the first electrode 111 is a fixed potential terminal, and the second electrode 112 is a Receive electrode (Rx).

Figure 9:
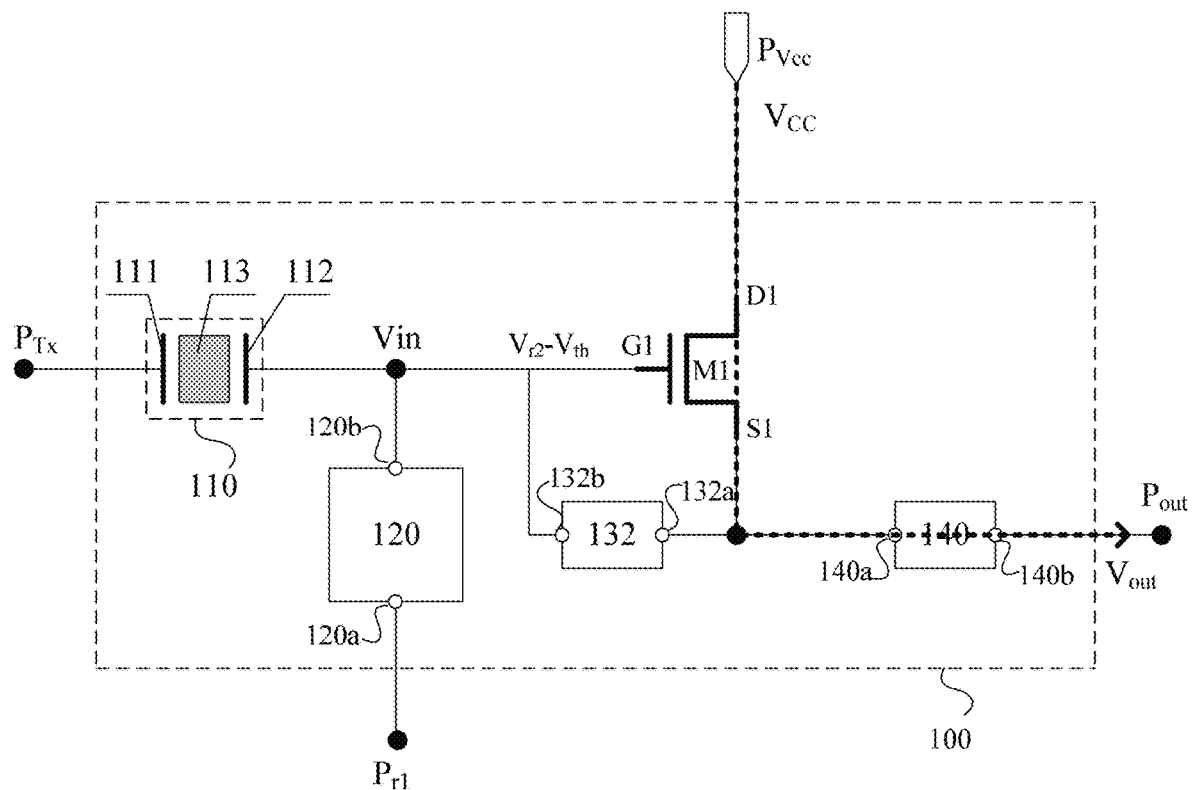
FIG. 9 is a schematic diagram of the working principle of the ultrasonic induction circuit provided by the embodiment illustrated in FIG. 7 during the process of outputting ultrasonic signals.

A third stage (an ultrasonic wave reception and output stage): after reaching the piezoelectric film 113 of the ultrasonic sensor 110, the reflected ultrasonic signal is converted into an AC voltage signal by the piezoelectric film 113. After reception of the ultrasonic signal, the potential of the gate G1 of M1 is the AC voltage signal converted from the received ultrasonic signal. When the power supply voltage $V_{CC}$ is fixed, the voltage signal $V_{out}$ output by the ultrasonic induction circuit 100 will be directly affected by the potential of the gate G1. FIG. 9 is a schematic diagram of the working principle of the ultrasonic induction circuit provided by the embodiment shown in FIG. 7 during the process of ultrasonic signal output. FIG. 9 illustrates a current direction of the output voltage signal under the action of the power supply voltage $V_{CC}$ at this stage with a dotted line in boldface. At this stage, the above-mentioned shared port serves as the power supply voltage terminal $P_{Vcc}$ and supplies the power supply voltage $V_{CC}$. In addition, an AC voltage signal converted by the piezoelectric film layer 113 and output from the Node Vin reaches the Node Vin via the second electrode 112 of the ultrasonic sensor 110. The AC voltage signal at the Node Vin directly affects the output voltage signal $V_{out}$ which is output after passing through M1 and the signal output sub-circuit 140.

Based on the above analysis of the working process of the ultrasonic induction circuit 100 in the embodiment of the present disclosure, the reference potential supplied to the Node Vin through M1 and the compensation sub-circuit 132 is $V_{r2}-V_{th}$ before receiving the reflected ultrasonic signal. Therefore, the voltage signal $V_{out}$ output by the ultrasonic induction circuit 100 is determined by the AC voltage signal converted by the ultrasonic sensor 110, and the corresponding output current is:

$$I = \frac{1}{2}\mu_n C_{ox} \frac{W}{L}(V_{GS} - (V_{r2} - V_{th}) - V_{th}) = \frac{1}{2}\mu_n C_{ox} \frac{W}{L}(V_{GS} - V_{r2}); \quad (3)$$

In the above formula (3), n is the mobility of the channel of M1. $C_{ox}$ is the capacitance of M1.

$$\frac{W}{L}$$

is the width-length ratio of the channel of M1. $V_{GS}$ is the voltage between the gate G1 and the second electrode S1 of M1. $V_{th}$ is the threshold voltage of M1. $V_{r2}$ is the fixed potential of the second potential supply terminal $P_{r2}$.

It may be seen from the above formula (3), the output voltage signal $V_{out}$ has nothing to do with the threshold voltage $V_{th}$ of M1, that is, the influence of the threshold voltage $V_{th}$ of transistor M1 on the output voltage signal $V_{out}$ of the ultrasonic induction circuit 400 in the circuit shown in FIG. 5 is eliminated, so that the problems of errors in identification of the ridges and valleys of the user's finger, thereby affecting touch performance in the ultrasonic induction circuit 400 shown in FIG. 5, and the like may be avoided.

The ultrasonic induction circuit 100 provided by the embodiment of the present disclosure includes an ultrasonic sensor 110 having a first electrode 111, a second electrode 112 and a piezoelectric film layer 113, a first potential supply sub-circuit 120, M1, a compensation sub-circuit 132, and a signal output sub-circuit 140. The connection mode between an ultrasonic sensor 110 and the above sub-circuits may be referred to FIGS. 7-9 and the description of the above embodiments. When the ultrasonic induction circuit 100 provided by the embodiment of the present disclosure is used for fingerprint recognition or touch operation, before receiving the transmitted and reflected ultrasonic waves, a fixed potential may be supplied to the second electrode 112 via M1 and the compensation sub-circuit 132 and the voltage of the fixed potential is $V_{r2}-V_{th}$, so that the output voltage signal may be independent of the threshold voltage $V_{th}$ of M1. Therefore, in the embodiments of this disclosure, by reasonably setting the hardware structure of the ultrasonic induction circuit 100, as for the display device integrated with the touch function, the problem that the output value of the voltage signal for implementing the touch operation is affected by the threshold voltage of the transistor in the sensing circuit, which generates errors in the determination of fingerprint ridges and valleys thereby affecting the touch performance can be avoided.

In an exemplary embodiment, in the ultrasonic induction circuit 100 provided by the embodiment of the present disclosure, the structure of the first potential supply sub-circuit 120 may be any one of the following structures.

Figure 10:
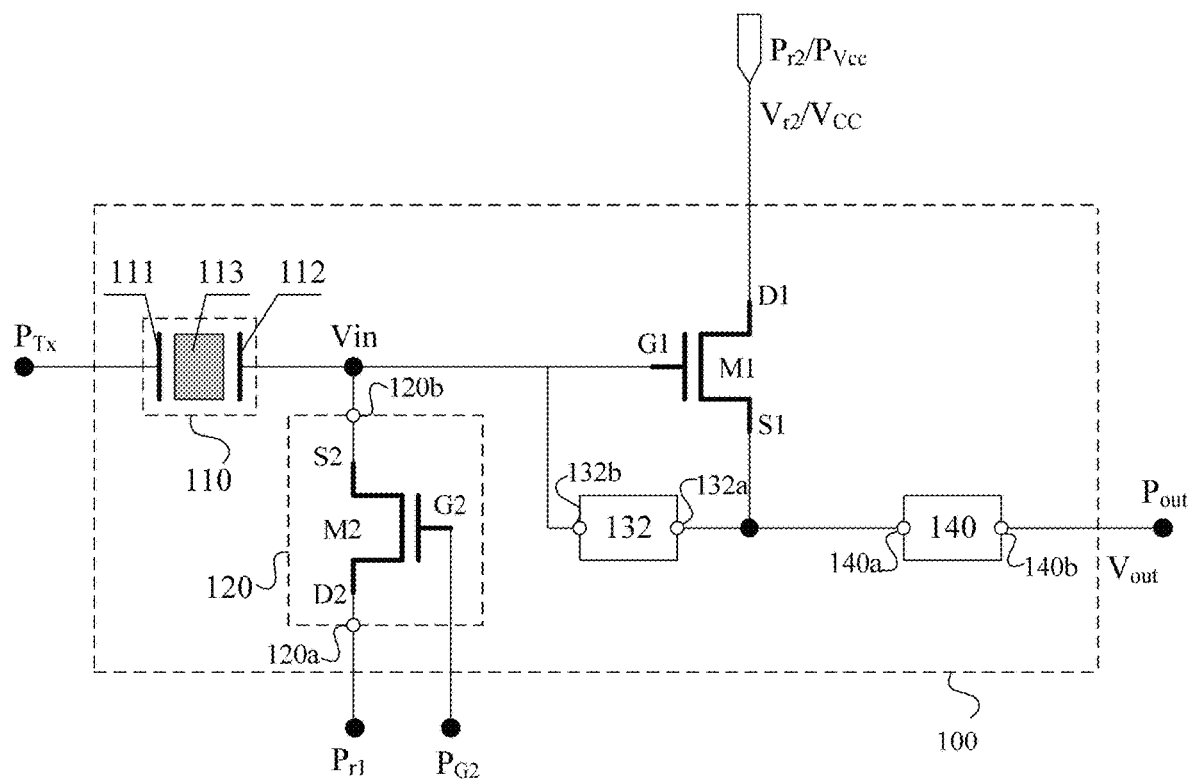
FIG. 10 is a schematic structural diagram of another ultrasonic induction circuit provided by an embodiment of the present disclosure.

In a first type, a first potential supply sub-circuit 120 includes a second transistor (hereinafter referred to as M2), a second electrode S2 of M2 being electrically connected to the second electrode 112, a first electrode D2 of M2 being electrically connected to the first potential supply terminal $P_{r1}$ and a gate G2 of M2 being electrically connected to a switch terminal $P_{G2}$ of M2. FIG. 10 is a schematic structural diagram of another ultrasonic induction circuit provided by an embodiment of the present disclosure, and FIG. 10 schematically shows a structure in which the first potential supply sub-circuit 120 includes M2.

Figure 11:
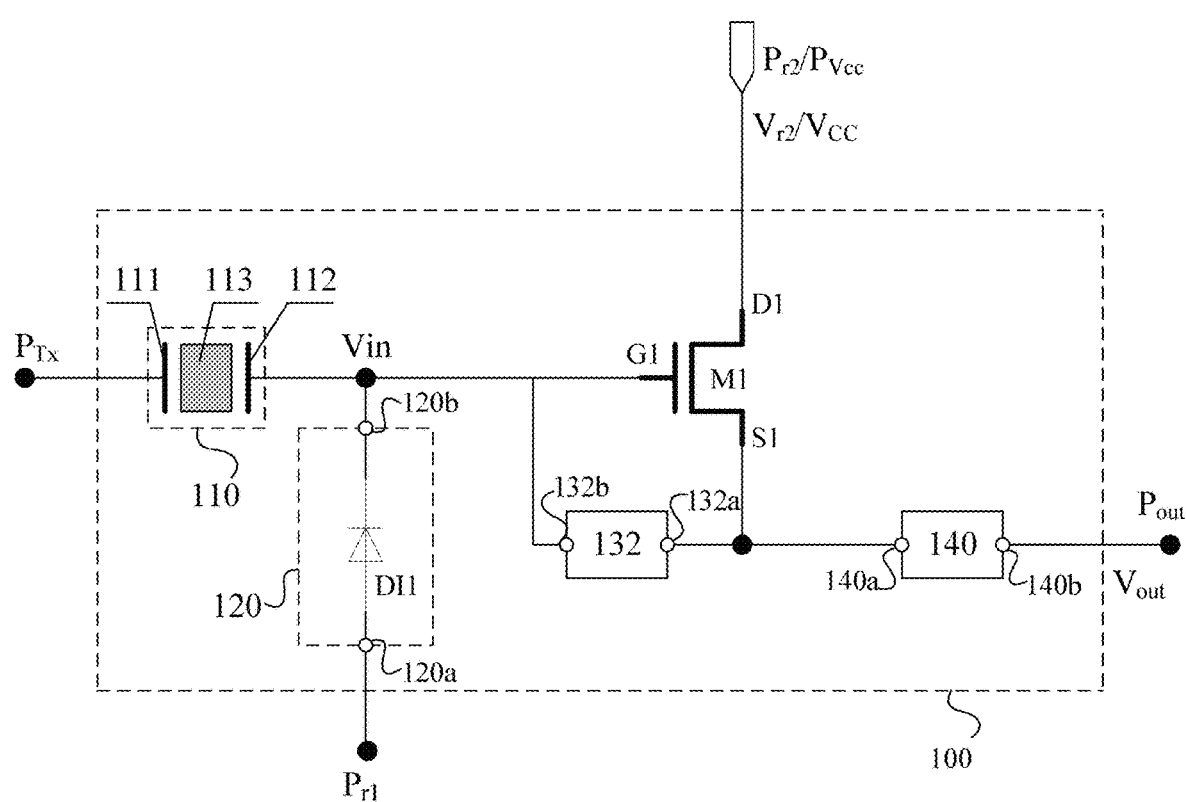
FIG. 11 is a schematic structural diagram of another ultrasonic induction circuit provided by an embodiment of the present disclosure.

In a second type, a first potential supply sub-circuit 120 includes a first diode (hereinafter referred to as DI1), a second electrode of DI1 being electrically connected to the second electrode 112, and a first electrode of DI1 being electrically connected to the first potential supply terminal $P_{r1}$. The first electrode of the DI1 may be an anode and the second electrode may be a cathode for example. FIG. 11 is a schematic structural diagram of another ultrasonic induction circuit provided by an embodiment of the present disclosure, and FIG. 11 schematically shows a structure in which the first potential supply sub-circuit 120 includes DI1.

Figure 12:
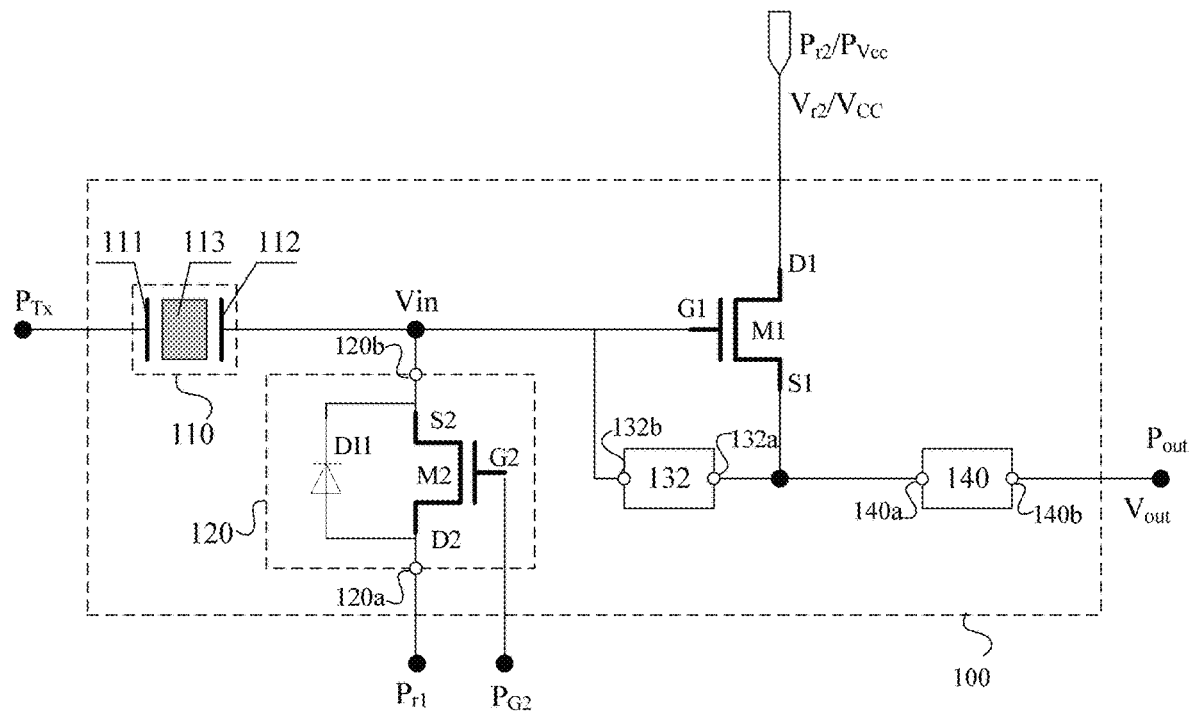
FIG. 12 is a schematic structural diagram of another ultrasonic induction circuit provided by an embodiment of the present disclosure.

In a third type, a first potential supply sub-circuit 120 includes M2 and DI1 connected in parallel, a second electrode S2 of M2 and a second electrode of DI1 being electrically connected to the second electrode 112 respectively, a first electrode D2 of M2 and a first electrode of DI1 being electrically connected to the first potential supply terminal $P_{r1}$, and a gate G2 of M2 being electrically connected to a switch terminal $P_{G2}$ of M2. The first electrode of the DI1 may be an anode and the second electrode may be a cathode for example. FIG. 12 is a schematic structural diagram of another ultrasonic induction circuit provided by an embodiment of the present disclosure, and FIG. 12 schematically shows a structure in which the first potential supply sub-circuit 120 includes M2 and DI1 connected in parallel.

The structure of the first potential supply sub-circuit 120 in the embodiment of the present disclosure is not limited to the above three structures. The three structures of the first potential supply sub-circuit 120 shown in FIGS. 10-12 are taken as examples for explanation. Any circuit structure may be used as the first potential supply sub-circuit 120 in the embodiment of the present disclosure as long as it can supply a stable fixed potential to Node Vin at the transmission stage of the ultrasonic induction circuit 100.

In an exemplary embodiment, in the ultrasonic induction circuit 100 provided by the embodiment of the present disclosure, the structure of the compensation sub-circuit 132 may be any one of the following structures.

Figure 13:
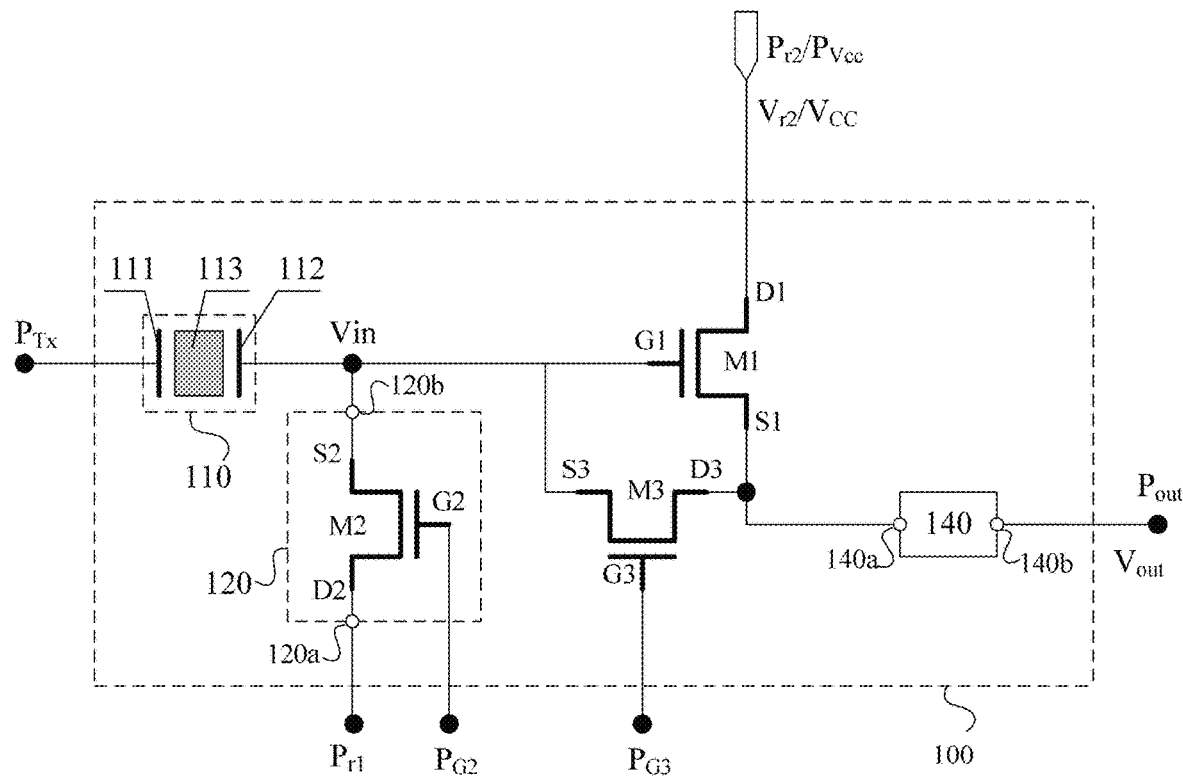
FIG. 13 is a schematic structural diagram of another ultrasonic induction circuit provided by an embodiment of the present disclosure.

A compensation sub-circuit 132 of a first type includes a third transistor (hereinafter referred to as M3), a first electrode D3 of M3 being electrically connected to the second electrode S1 of M1, a second electrode S3 of M3 being electrically connected to the gate G1 of M1, and a gate G3 of M3 being electrically connected to a switch terminal $P_{G3}$ of M3. FIG. 13 is a schematic structural diagram of another ultrasonic induction circuit provided by an embodiment of the present disclosure, and FIG. 13 schematically shows a structure in which the compensation sub-circuit 132 includes M3. The illustration of FIG. 13 is based on the structure of the ultrasonic induction circuit 100 shown in FIG. 10 as an example.

Figure 14:
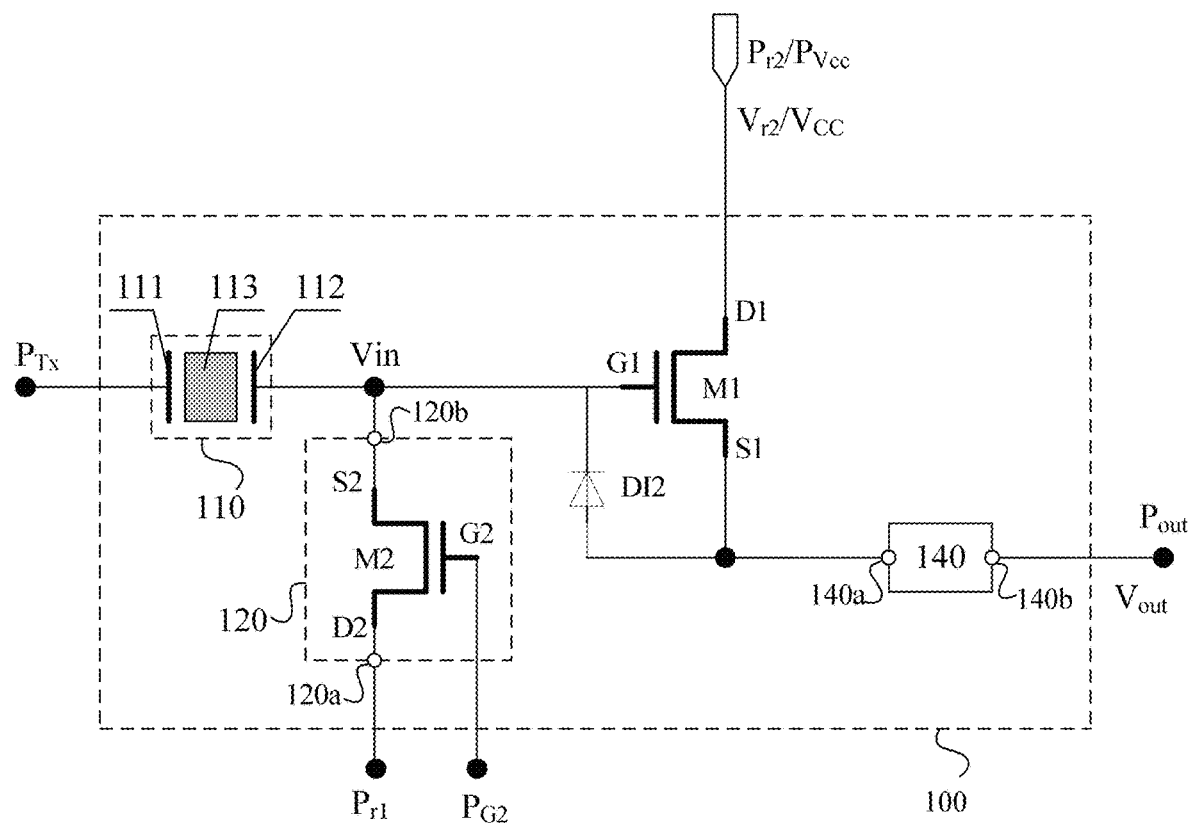
FIG. 14 is a schematic structural diagram of another ultrasonic induction circuit provided by an embodiment of the present disclosure.

A compensation sub-circuit 132 of a second type includes a second diode (hereinafter referred to as DI2), a first electrode of DI2 being electrically connected to the second electrode S1 of M1, and a second electrode of DI2 being electrically connected to the gate G1 of M1. The first electrode of the DI2 may be an anode and the second electrode may be a cathode for example. FIG. 14 is a schematic structural diagram of another ultrasonic induction circuit provided by an embodiment of the present disclosure, and FIG. 14 schematically shows a structure in which the compensation sub-circuit 132 includes DI2. Similarly, the illustration of FIG. 14 is based on the structure of the ultrasonic induction circuit 100 shown in FIG. 10 as an example.

Figure 15:
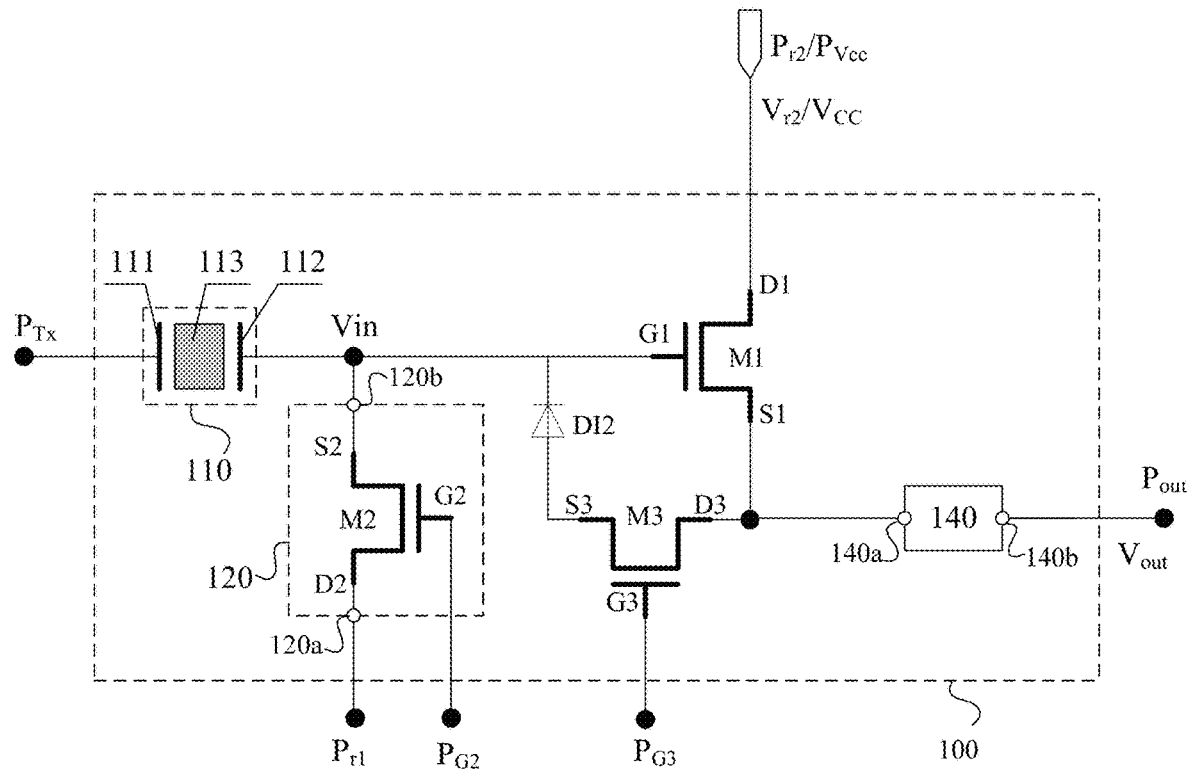
FIG. 15 is a schematic structural diagram of another ultrasonic induction circuit provided by an embodiment of the present disclosure.

A compensation sub-circuit 132 of a third type includes M3 and DI2 connected in series, a first electrode D3 of M3 being electrically connected with the second electrode S1 of M1, a second electrode S3 of M3 being electrically connected with the a first electrode of DI2, a second electrode of DI2 being electrically connected with the gate G1 of M1, and a gate G3 of M3 being electrically connected to a switch terminal of $P_{G3}$ of M3. The first electrode of the DI2 may be an anode and the second electrode may be a cathode for example. FIG. 15 is a schematic structural diagram of another ultrasonic induction circuit provided by an embodiment of the present disclosure, and FIG. 15 schematically shows a structure in which the compensation sub-circuit 132 includes M3 and DI2 connected in series. Similarly, the illustration of FIG. 15 is based on the structure of the ultrasonic induction circuit 100 shown in FIG. 10 as an example.

The structure of the compensation sub-circuit 132 in the embodiment of the present disclosure is not limited to the above three structures. The three structures of the compensation sub-circuit 132 shown in FIGS. 13-15 are taken as examples for explanation. Any circuit structure may be served as the compensation sub-circuit 132 of the embodiments of the present disclosure as long as it may work coordinately with M1 to supply Node Vin with a stable fixed potential which will not affect the output voltage signal before the ultrasonic induction circuit 100 receives ultrasonic waves.

Figure 16:
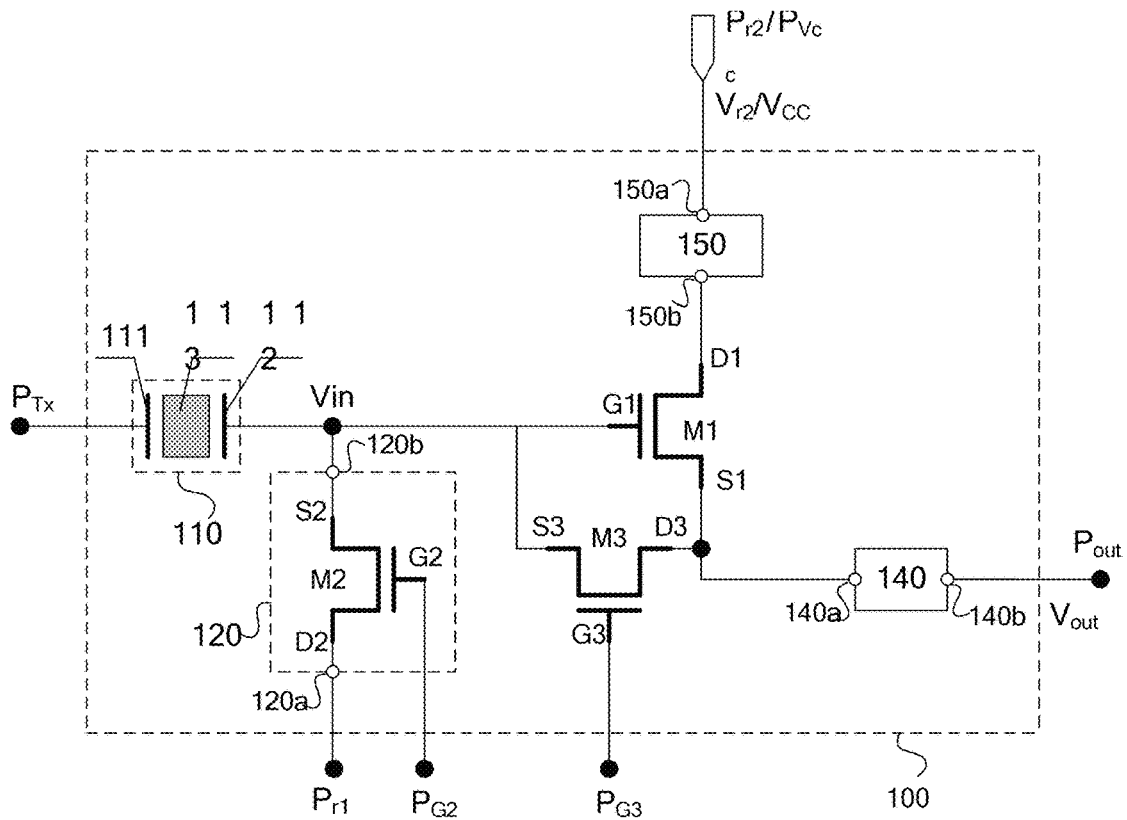
FIG. 16 is a schematic structural diagram of another ultrasonic induction circuit provided by an embodiment of the present disclosure.

In an exemplary embodiment, FIG. 16 is a structural schematic diagram of another ultrasonic induction circuit provided by an embodiment of the present disclosure. On the bases of the ultrasonic induction circuit 100 provided by the above embodiments, the ultrasonic induction circuit 100 provided by this embodiment of the present disclosure may further include a power supply circuit 150, a second terminal 150b of the power supply circuit 150 being electrically connected with the first electrode of the first transistor, and a first terminal 150a of the power supply circuit 150 being electrically connected to the second potential supply terminal $P_{r2}$, which is also a shared port with the power supply voltage terminal $P_{Vcc}$ as shown in FIG. 16.

Figure 17:
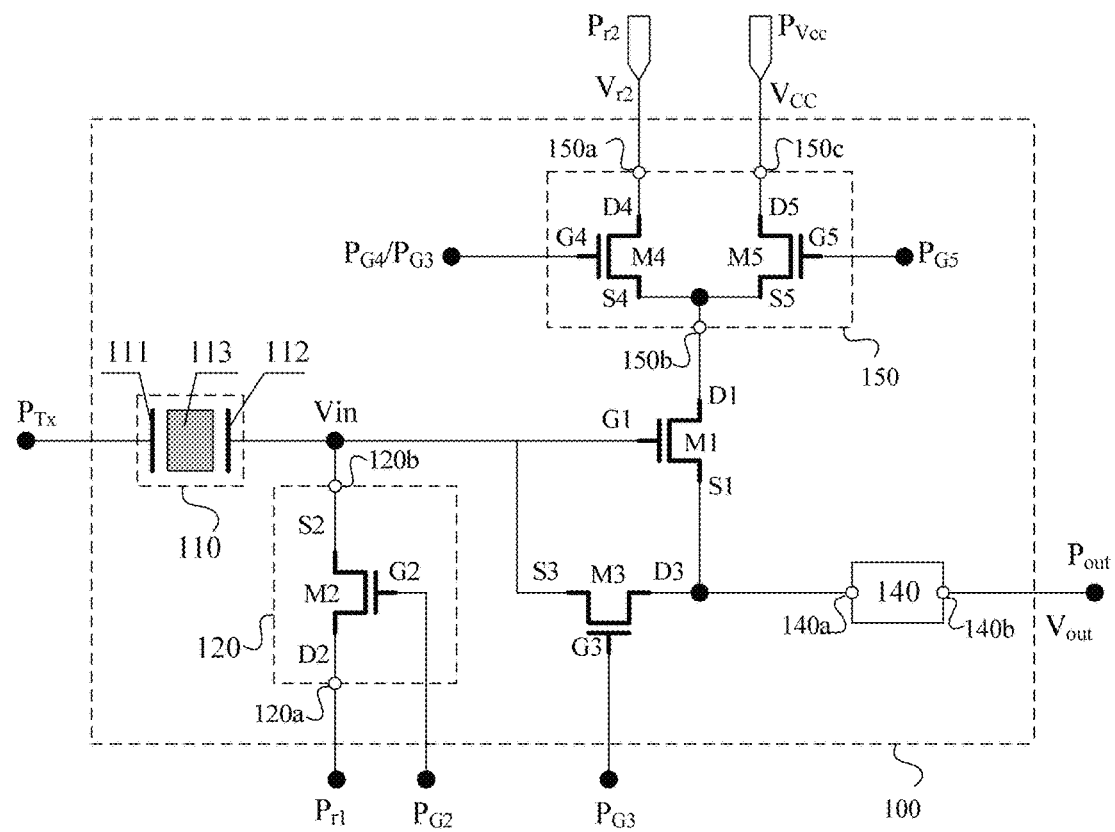
FIG. 17 is a schematic structural diagram of another ultrasonic induction circuit provided by an embodiment of the present disclosure.

The illustration of FIG. 16 is based on the structure of the ultrasonic induction circuit 100 shown in FIG. 13 as an example. In the above power supply sub-circuit 150, the second potential supply terminal $P_{r2}$ which is connected with the first terminal 150a of the power supply sub-circuit 150 may be a port shared with power voltage terminal $P_{Vcc}$, (the illustration of FIG. 16 is based on the structure), and the shared port may supply a fixed potential $V_{r2}$ and a power voltage $V_{cc}$. Furthermore, based on the inside structure of the power supply sub-circuit 150, the second potential supply terminal $P_{r2}$ and the power voltage terminal $P_{Vcc}$ may alternatively be two independent ports and then the power supply sub-circuit 150 with this structure may have a third terminal 150c which is connected with the power voltage terminal $P_{Vcc}$ (as shown by FIG. 17).

With the above-mentioned power supply sub-circuit 150, a working voltage, i.e., a power voltage $V_{CC}$, may be supplied to the whole ultrasonic induction circuit 100 via the second potential supply terminal $P_{r2}$ (power supply voltage terminal $P_{Vcc}$) which is electrically connected to the first terminal 150a of the power supply sub-circuit 150. Alternatively, M1 and the compensation sub-circuit 132 may be turned on to supply a fixed potential $V_{r2}$–$V_{th}$ for Node Vin after the ultrasonic sensor 110 transmits ultrasonic waves and before the ultrasonic sensor 110 receives ultrasonic wave.

In an exemplary embodiment, in the ultrasonic induction circuit 100 provided by the embodiment of the present disclosure, the structure of the power supply sub-circuit 150 may be any one of the following structures.

A power supply sub-circuit 150 of a first type may include a fourth transistor (hereinafter referred to as M4) and a fifth transistor (hereinafter referred to as M5), a second electrode S4 of M4 and a second electrode S5 of M5 being electrically connected to the first electrode D1 of M1 respectively, a first electrode D4 of M4 being electrically connected to the second potential supply terminal $P_{r2}$, a gate G4 of M4 being electrically connected to a switch terminal $P_{G4}$ of M4, a first electrode D5 of M5 being electrically connected to the power voltage terminal $P_{Vcc}$, and a gate G5 of M5 being electrically connected to a switch terminal $P_{G5}$ of M5. FIG. 17 is a schematic structural diagram of another ultrasonic induction circuit provided by an embodiment of the present disclosure, and FIG. 17 illustrates that the power supply sub-circuit 150 includes the structures of the above M4 and M5. The illustration of FIG. 17 is based on the structure of the ultrasonic induction circuit 100 shown in FIG. 16 as an example. FIG. 17 illustrates the embodiment by illustrating the second potential supply terminal $P_{r2}$ and the power voltage supply terminal $P_{Vcc}$ as two independent ports as an example. In the ultrasonic induction circuit 100 according to the embodiment of the present disclosure, if M3 is included in the compensation sub-circuit 132, it is required that M4 and M3 are turned on simultaneously after ultrasonic waves are transmitted and before the ultrasonic waves are received. Therefore, the gate G4 of M4 and the gate G3 of M3 may share one switch terminal. For example, the gate G4 of M4 may be electrically connected to the switch terminal $P_{G3}$ of M3.

Figure 18:
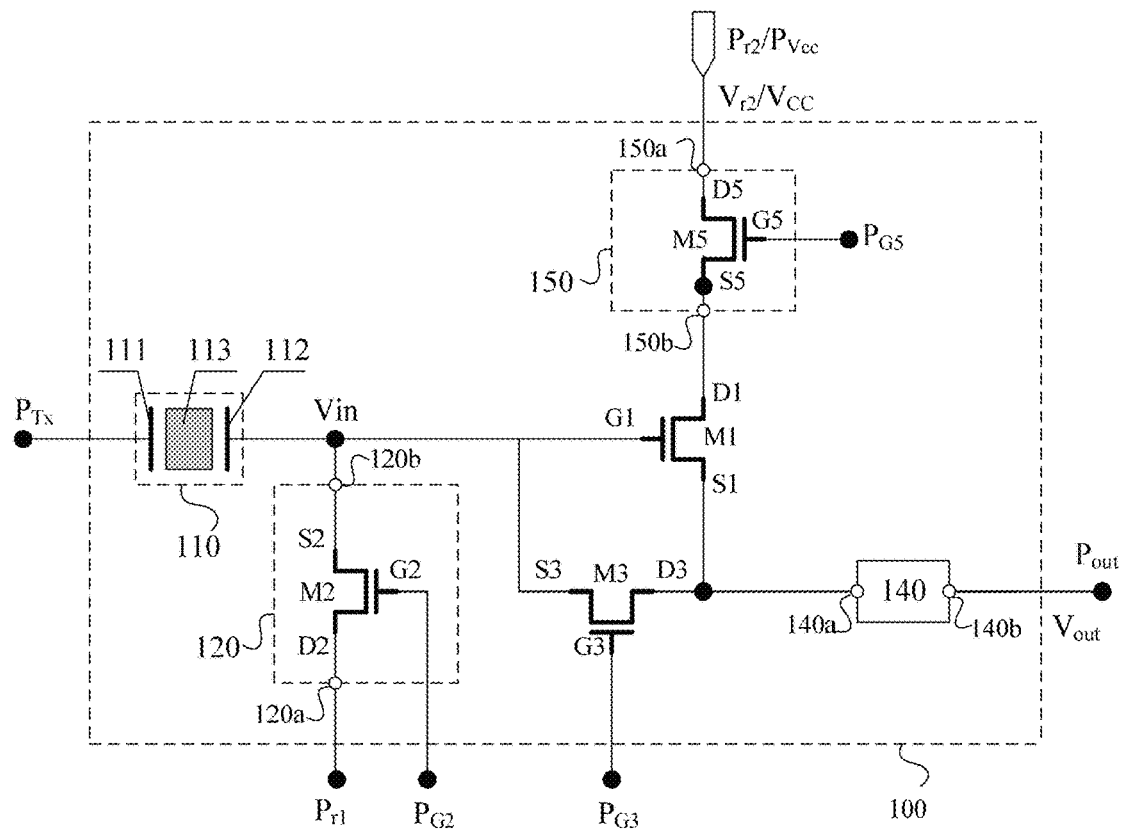
FIG. 18 is a schematic structural diagram of another ultrasonic induction circuit provided by an embodiment of the present disclosure.

A power supply sub-circuit 150 of a second type may include a fifth transistor (M5), a second electrode S5 of M5 being electrically connected to the first electrode D1 of M1, and a first electrode D5 of M5 being electrically connected to the shared port, i.e., the second potential supply terminal $P_{r2}$ and the power voltage terminal $P_{Vcc}$, and a gate G5 of M5 being electrically connected to a switch terminal $P_{G5}$ of M5. FIG. 18 is a schematic structural diagram of another ultrasonic induction circuit provided by an embodiment of the present disclosure, and FIG. 18 illustrates that the power supply sub-circuit 150 includes the structure of the above M5. The illustration of FIG. 18 is based on the structure of the ultrasonic induction circuit 100 shown in FIG. 16 as an example.

The structure of the power supply sub-circuit 150 in the embodiment of the present disclosure is not limited to the above two structures. The two structures of the power supply sub-circuit 150 shown in FIGS. 17 and 18 are taken as examples for explanation. Any circuit structure may be served as the power supply sub-circuit 150 of the embodiments of the present disclosure as long as it can supply a power voltage terminal $P_{Vcc}$ to the ultrasonic induction circuit 100 and before the ultrasonic induction circuit 100 receives ultrasonic waves, implement to supply the Node Vin with a stable fixed potential which will not affect the output voltage signal.

Figure 19:
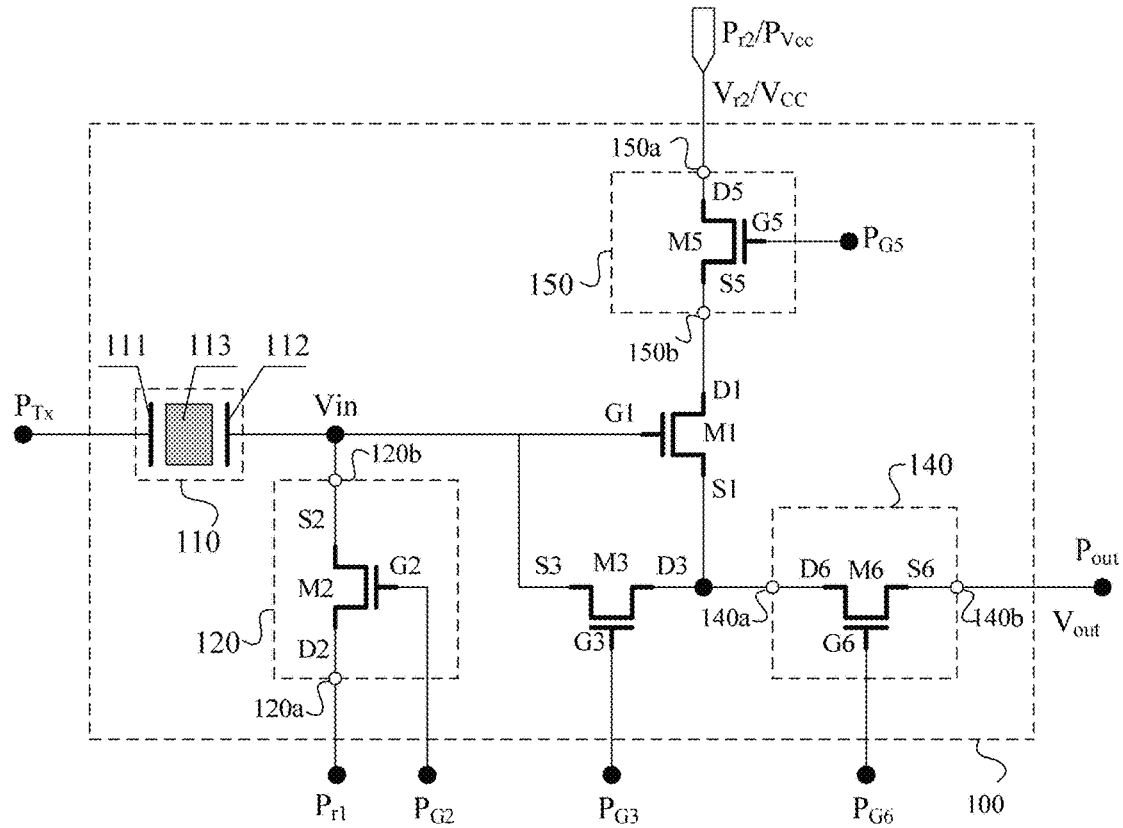
FIG. 19 is a schematic structural diagram of another ultrasonic induction circuit provided by an embodiment of the present disclosure.

In an exemplary embodiment, FIG. 19 is a schematic structural diagram of another ultrasonic induction circuit provided by an embodiment of the present disclosure; On the bases of the above embodiments, in the ultrasonic induction circuit 100 provided by the embodiment of the present disclosure, the signal output sub-circuit 140 may include sixth transistor (hereinafter referred to as M6), a first electrode D6 of M6 being electrically connected to the second electrode S1 of M1, a second electrode S6 of M6 being electrically connected to the second terminal $P_{out}$ of the ultrasonic induction circuit 100 for outputting the voltage signal received and converted by the ultrasonic sensor 110, and a gate G6 of M6 being connected to the switch terminal $P_{G6}$ of M6. The second electrode S6 of M6 is electrically connected to the second terminal 140b of the signal output sub-circuit 140 which is also electrically connected to the second terminal $P_{out}$ of the whole ultrasonic induction circuit 100, or in other words, the second terminal 140b is the second terminal $P_{out}$ of the whole ultrasonic induction circuit 100. With the signal output sub-circuit 140 of the above structure, M6 is kept off from the ultrasonic wave transmission stage to the ultrasonic wave reception stage. M6 may be turned on to output voltage signals during the process of voltage signals output.

The illustration of FIG. 19 is based on the structure of the ultrasonic induction circuit 100 shown in FIG. 18 as an example. FIG. 19 illustrates M6 by a schematic illustration of the structure of the signal output sub-circuit 140. Any structure be served as long as it can turn off the signal output sub-circuit 140 during the ultrasonic wave transmission stage and reception stage of the ultrasonic induction circuit 100 and may turn on the signal output sub-circuit 140 at the voltage signal output stage of the ultrasonic induction circuit 100, can be served as the signal output sub-circuit 140.

In an exemplary embodiment, the substrate of the ultrasonic induction circuit 100 provided in the above embodiments of the present disclosure may be a hard substrate, such as a Glass substrate, or a flexible substrate, and the flexible material may be Polyimide (PI). The M1 to M6 may be N-Metal-Oxide-Semiconductor (NMOS) transistors or P-Metal-Oxide-Semiconductor (PMOS) transistors. The ultrasonic induction circuit 100 in the embodiments shown in FIGS. 7 to 19 is illustrated by an example that M1 to M6 are NMOS transistors. Then, the first electrodes of M1 to M6 are Drains, the second electrodes of M1 to M6 are Sources, the gates of M1 to M6 are Gates. If M1 to M6 are PMOS transistors, then the first electrodes of M1 to M6 are Sources, the second electrodes of M1 to M6 are Drains, the gates of M1 to M6 are Gates.

In an exemplary embodiment, in the ultrasonic induction circuit 100 provided by the above embodiments of the present disclosure, in order to achieve better performance, M2 and M3 may use Indium Gallium Zinc Oxide (IGZO) TFT, so that the leakage current of the whole circuit 100 is small, and the fixed potential of Node Vin may be kept more stable, which is convenient for maintaining signals.

With the structure of the ultrasonic induction circuit 100 according to the above embodiments of the present disclosure, ultrasonic waves may be transmitted and received more efficiently. Especially at the stage when the ultrasonic induction circuit 100 receives ultrasonic waves, the output voltage signal is more stable, and the output voltage signal will not be affected by the threshold voltage $V_{th}$ of M1 in the circuit shown in FIG. 5.

Figure 20:
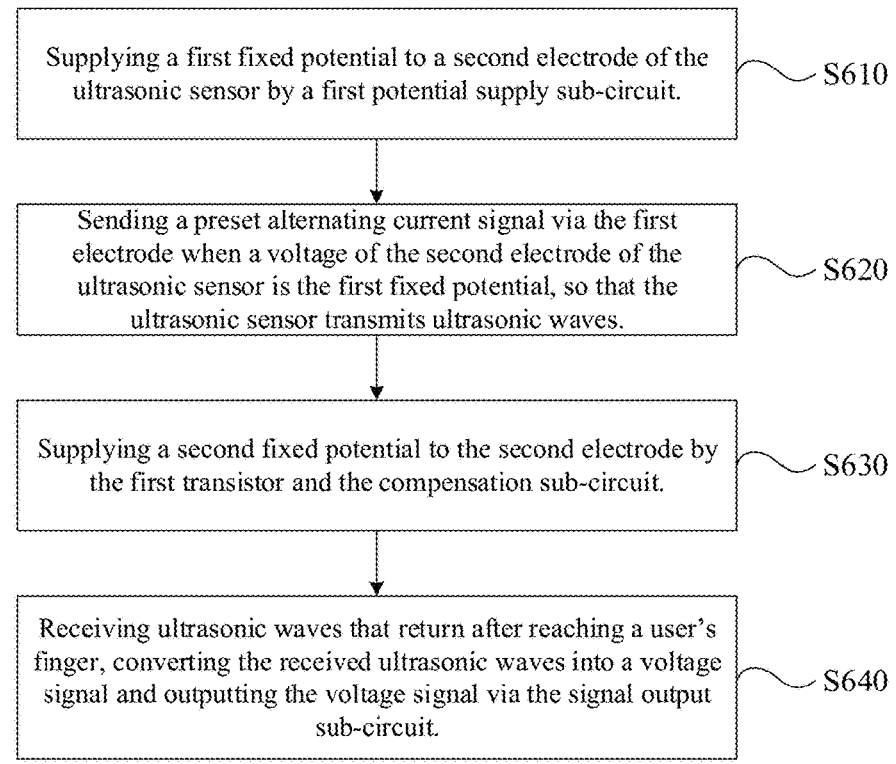
FIG. 20 is a flowchart of a driving method of an ultrasonic induction circuit provided by an embodiment of the present disclosure.

Based on the ultrasonic induction circuit 100 provided in the above embodiments of this disclosure, this embodiment of this disclosure also provides a driving method of the ultrasonic induction circuit, which may be executed by the ultrasonic induction circuit 100 provided in any of the above embodiments of this disclosure. FIG. 20 is a flowchart of a driving method of for ultrasonic induction circuit provided by this embodiment of this disclosure, which includes steps S610 to S640.

In S610, a first fixed potential is supplied to a second electrode of the ultrasonic sensor via a first potential supply sub-circuit.

In S620, a preset alternating current signal is sent via the first electrode when a voltage of the second electrode of the ultrasonic sensor is the first fixed potential, to enable the ultrasonic sensor to transmit ultrasonic waves.

In S630, a second fixed potential is supplied to the second electrode via the first transistor and the compensation sub-circuit.

In S640, when receiving returned ultrasonic waves after they reaching a user's finger, the ultrasonic sensor convert the received ultrasonic waves into a voltage signal and output the voltage signal via the signal output sub-circuit.

The driving method provided by the embodiment of the present disclosure is implemented by the ultrasonic induction circuit 100 in any of the above embodiments shown in FIGS. 7 to 19.

The structure of the ultrasonic induction circuit 100 and the functions implemented by the sub-circuits and electronic components therein have been described in detail in the above embodiments and thus, are not to be repeated here.

In the driving method provided by the embodiment of the present disclosure, steps S610 to S620 are the operations performed by the ultrasonic induction circuit 100 at the first stage (transmission stage). In the first stage, when the first potential supply sub-circuit 120 is turned on, the first fixed potential $V_{r1}$ is supplied to the Node Vin via $P_{r1}$ and a preset alternating current signal, i.e., an input AC voltage signal $V_{Tx}$ is input to the first electrode 111 via $P_{Tx}$ which is, for example, a high-voltage square wave or sine wave signal, so as to transmit ultrasonic waves via the ultrasonic sensor 110. In the above transmission stage, the second electrode 112 is a fixed potential terminal, and the first electrode 111 is a Transport electrode (Tx).

Step S630 is an operation performed by the ultrasonic induction circuit 100 at the second stage (before receiving the reflected ultrasonic signal), which is a time period after the first stage and before the ultrasonic signal is reflected from the user's finger. M1 and the compensation sub-circuit 132 may be turned on to provide a second fixed potential to the second electrode, and the potential $V_{r2}$ provided by the second potential supply terminal $P_{r2}$ first passes through the first electrode D1 and the second electrode S1 of M1 and reaches Node Vin after passing through the compensation sub-circuit 132. Referring to the current direction of the second fixed potential shown in FIG. 8, the magnitude of the second fixed potential may be the fixed potential $V_{r2}$ provided by the second potential supply terminal $P_{r2}$ minus the threshold voltage $V_{th}$ of M1, i.e. $V_{r2}-V_{th}$, that is, the second fixed potential $V_{r2}-V_{th}$ provided to the second electrode in step S630 is similar to the reference potential Vreset (i.e., V1) of the ultrasonic induction circuit 400 shown in FIG. 5 before it receives the ultrasonic signal.

Step S640 is an operation performed by the ultrasonic induction circuit 100 at the third stage (ultrasonic wave reception and output stage). The ultrasonic signal transmitted in S620 will be reflected when it reaches the user's finger. After reaching the piezoelectric film 113 of the ultrasonic sensor 110, the reflected ultrasonic signal is converted into an AC voltage signal by the piezoelectric film 113. After the ultrasonic signal is received, the potential of the gate G1 of M1 is the AC voltage signal converted from the received ultrasonic signal. When the power supply voltage $V_{CC}$ is fixed, the potential of the gate G1 will directly affect the voltage signal $V_{out}$ output by the ultrasonic induction circuit 100, referring to the current direction of the output voltage signal $V_{out}$ shown in FIG. 9.

Based on the ultrasonic induction circuit 100 in the above embodiments of the present disclosure and the driving method of the ultrasonic induction circuit provided by the above embodiments of the present disclosure, before receiving the reflected ultrasonic signal, the reference potential supplied to the Node Vin via M1 and the compensation sub-circuit 132 is $V_{r2}-V_{th}$. Therefore, the voltage signal $V_{out}$ output by the ultrasonic induction circuit 100 is determined by the AC voltage signal converted by the ultrasonic sensor 110, and the corresponding output current is:

$$I = \frac{1}{2}\mu_n C_{ox} \frac{W}{L}(V_{GS} - (V_{r2} - V_{th}) - V_{th}) = \frac{1}{2}\mu_n C_{ox} \frac{W}{L}(V_{GS} - V_{r2}); \quad (4)$$

In the above formula (4), $\mu_n$ is the mobility of the channel of M1. $C^{ox}$ is the capacitance of M1.

$$\frac{W}{L}$$

is the width-length ratio of the channel of M1. $V_{GS}$ is the voltage between the gate G1 and the second electrode S1 of M1. $V_{th}$ is the threshold voltage of M1. $V_{r2}$ is the fixed potential of the second potential supply terminal $P_{r2}$.

It may be seen from the above formula (4), the output voltage signal $V_{out}$ has nothing to do with the threshold voltage $V_{th}$ of M1, that is, the influence of the threshold voltage $V_{th}$ of transistor M1 on the output voltage signal $V_{out}$ of the ultrasonic induction circuit 400 in the circuit shown in FIG. 5 is eliminated, so that the problems of the ultrasonic induction circuit 400 shown in FIG. 5, such as errors in identification of the ridges and valleys of the user's finger thereby affecting touch performance, etc. are avoided.

According to the driving method of the ultrasonic induction circuit provided by the embodiment of the present disclosure, based on the hardware structure of the ultrasonic induction circuit 100 provided by the above embodiments of the present disclosure, firstly a first fixed potential $V_{r1}$ is supplied to a second electrode of an ultrasonic sensor through a first potential supply sub-circuit at the ultrasonic wave transmission stage; and a preset alternating current signal is transmitted via the first electrode under the first fixed potential $V_{r1}$ so that the ultrasonic sensor transmits ultrasonic waves. Before receiving the ultrasonic waves, a second fixed potential $V_{r2}-V_{th}$ is supplied to the second electrode via M1 and the compensation sub-circuit 132. Then the ultrasonic sensor receives the sound wave reflected after reaching the user's finger, converts the received ultrasonic wave into a voltage signal and outputs it through the signal output sub-circuit. When using the method for driving the ultrasonic induction circuit provided by the embodiment of the present disclosure to perform fingerprint recognition or touch operation, before receiving the transmitted and reflected ultrasonic waves, a fixed potential may be supplied to the second electrode 112 via M1 and the compensation sub-circuit 132 and the voltage of the fixed potential is $V_{r2}-V_{th}$, so that the output voltage signal may be independent of the threshold voltage $V_{th}$ of M1. Therefore, in the embodiments of the disclosure, by reasonably setting the hardware structure of the ultrasonic induction circuit 100 and the driving method thereof, as for the display device integrated with the touch function, the problem that errors occurred in the determination of fingerprint ridges and valleys and thereby affecting the touch performance due to the output value of the voltage signal for implementing the touch operation is affected by the threshold voltage of the transistor in the sensing circuit, can be avoided.

In an exemplary embodiment, in the driving method provided by the embodiment of the present disclosure, the implementations of S620 may include, turning on the first potential supply sub-circuit 120, and turning off M1, the compensation sub-circuit 132 and the signal output sub-circuit 140 to supply a first fixed potential $V_{r1}$ to the second electrode 112 via a first potential supply terminal $P_{r1}$ electrically connected to the first potential supply sub-circuit 120.

Based on the structure of the ultrasonic induction circuit 100 in the embodiments shown in FIGS. 7-12 of the present disclosure, at the first stage, i.e. in the process of executing S610 to S620, the first potential supply sub-circuit 120 is required to be kept on, while M1, the compensation sub-circuit 132 and the signal output sub-circuit 140 are required to be kept off so that a stable first fixed potential $V_{r1}$ may be supplied to the Node Vin.

The structure of the first potential supply sub-circuit 120 in the embodiment of the present disclosure may be shown with reference to FIGS. 10-12, and the types and connection modes of the electrical components in the sub-circuit 120 have been described in detail in the above embodiments and thus, will not be repeated here.

In an exemplary embodiment, in the driving method provided by the embodiment of the present disclosure, the implementation of S630 may include, turning on M1 and the compensation sub-circuit 132, and turning off the first potential supply sub-circuit 120 and the signal output sub-circuit 140 to supply a second fixed potential $V_{r2}-V_{th}$ to the second electrode 112 via a second potential supply terminal $P_{r2}$ electrically connected with M1.

Based on the structure of the ultrasonic induction circuit 100 in the embodiments shown in FIGS. 7-15 of the present disclosure, at the above second stage, i.e. in the process of executing S630, M1 and the compensation sub-circuit 132 are required to be kept on while the first potential supply sub-circuit 120 and the signal output sub-circuit 140 are required to be kept off so that a stable second fixed potential $V_{r2}-V_{th}$ may be supplied to the Node Vin.

In an exemplary embodiment, the structure of the compensation sub-circuit 132 in the embodiment of the present disclosure may be referred to FIGS. 13-15, and the types and connection modes of the electrical components in the compensation sub-circuit 132 have been described in detail in the above embodiments and thus, are not to be repeated here.

In an exemplary embodiment, in the driving method provided by the embodiment of the present disclosure, a reception process for the reflected ultrasonic wave in S640 is that the ultrasonic sensor receives ultrasonic waves that are reflected after reaching the user's finger. The implementation of the process may include, after rapidly increasing the second fixed potential Vr2–Vth to a third fixed potential $V_{r2}-V_{th}+\Delta V$ via M1 and the compensation sub-circuit 132, the received ultrasonic waves are sampled, and after sampling, the third fixed potential $V_{r2}-V_{th}+\Delta V$ is decreased to a fourth fixed potential $V_{r2}-V_{th}+\Delta V-\Delta V''$, which is the static working potential of M1. The above-mentioned process of receiving ultrasonic waves is also called sampling ultrasonic waves.

In an exemplary embodiment, in the driving method provided by the embodiment of the present disclosure, a process that the received ultrasonic wave is converted into a voltage signal and then output through the signal output sub-circuit in S640 is a process of outputting an ultrasonic wave signal, and the implementation of the process may include the following steps:

Step 1, the received ultrasonic wave is converted into AC voltage signal after passing through the piezoelectric film layer 113 of the ultrasonic sensor 110, Step 2, turning on the signal output sub-circuits 140 and M1, turning off the first potential supply sub-circuit 110 and the compensation sub-circuit 132, and outputting the voltage signal reaching the gate G1 of M1 through M1 and the signal output sub-circuit 140.

In the embodiment of the present disclosure, the AC voltage signal converted by the ultrasonic sensor 110 reaches the gate G1 of M1 through the second electrode 112. When the power supply voltage $V_{CC}$ is fixed, the potential of the gate G1 will directly affect the voltage signal $V_{out}$ output by the ultrasonic induction circuit 100, i.e. the output voltage signal $V_{out}$ is determined by the AC voltage signal of the gate G1 of M1.

Figure 21:
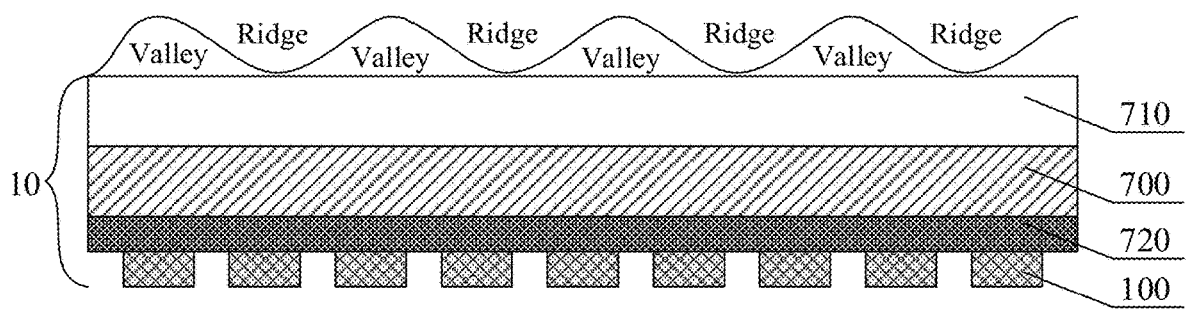
FIG. 21 is a schematic structural diagram of a display device provided by an embodiment of the present disclosure.

Based on the ultrasonic induction circuit 100 provided in the above embodiments of the present disclosure, an embodiment of the present disclosure also provides a display device, and FIG. 21 is a structural schematic diagram of a display device provided in the embodiment of the present disclosure. The display device 10 provided by the embodiment of the present disclosure may include a display panel 700, and ultrasonic sensing circuits 100 arranged in an array which may be the ultrasonic sensing circuit 100 in any of the above embodiments shown in FIGS. 7-19.

A display panel 700 in an embodiment of the present disclosure may be, for example, an Organic Electroluminance Display (OLED) panel, a Liquid Crystal Display (LCD) panel, etc. In the display device 10 shown in FIG. 21, the light-emitting side of the display panel 700 may be covered with a Cover Class (CG) 710 to protect the display panel 700 and the display panel 700 and the ultrasonic induction circuit 100 may be bonded by an adhesive layer 720. FIG. 21 only illustrates the overall structure of the ultrasonic induction circuit 100 arranged in an array without illustrating its internal structure.

Figure 22:
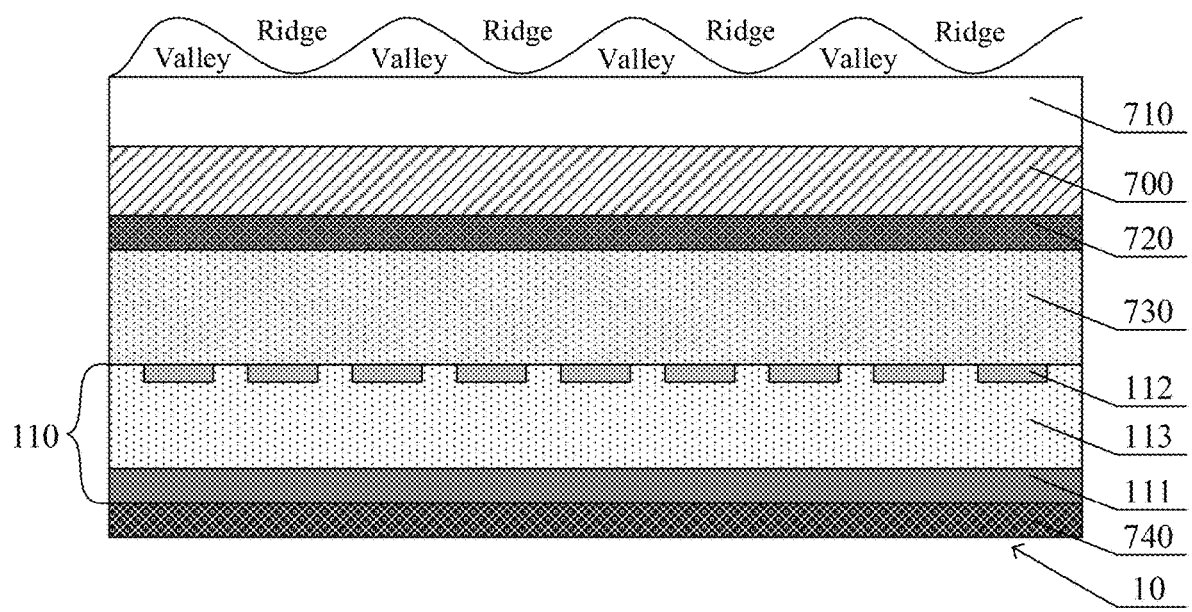
FIG. 22 is a schematic structural diagram of another display device provided by an embodiment of the present disclosure.

In one exemplary embodiment, FIG. 22 is a schematic diagram of a structure of another display device according to an embodiment of the disclosure. In the display device 10 provided by the embodiment of the present disclosure, the ultrasonic sensor 110 of the ultrasonic induction circuit 100 is disposed on the backplane 730 attached to the display panel 700. The second electrode 112 (Receive electrode), the piezoelectric film layer 113 and the first electrode 111 (Transport electrode) arranged in an array are sequentially disposed on one side of the backplane 730 away from the display panel 700. The second electrodes 112 are arranged on the backplane 730 adhered to the adhesive layer 720. The ultrasonic sensors 110 of the ultrasonic sensing circuits 100 arranged in array are illustrated in FIG. 22 and the ultrasonic sensors 110 are also arranged in array. FIG. 22 illustrates an example that the first electrodes 111 are shared by all the ultrasonic sensors 110, and the second electrodes 112 are arranged in array. In addition, the side of the first electrode 111 away from the display panel 700 is also provided with a protective layer 740.

In the display device 10 provided by the embodiment of the present disclosure, the display panel 700 and the ultrasonic sensors 110 are arranged in a bonding structure, that is, the ultrasonic sensors 110 arranged in array and the display panel 700 have the same size to facilitate the realization of full-screen fingerprint recognition and touch operation. According to the embodiment of the present disclosure, the ultrasonic sensing circuits 100 arranged in an array are integrated underneath the display screen (i.e., the display panel 700) of the display device 10, and these ultrasonic sensing circuits 100 are used for implementing fingerprint recognition and touch operation functions in the display panel 700. By optimizing the touch pixels (i.e., the ultrasonic sensing circuits 100) of the touch structure, the ultrasonic sensing circuits 100 receive signals more stably when receiving ultrasonic signals, and the performance of fingerprint recognition and touch operation is better.

The embodiments of the present disclosure further provide a computer-readable storage medium in which an executable instruction is stored. When the executable instruction is executed by a processor, the driving method for the ultrasonic induction circuit provided by any one of the above-described embodiments may be implemented. The implementations of the computer-readable storage medium provided by the embodiments of this disclosure is basically the same as the driving method of the ultrasonic induction circuit provided by the above embodiments of this disclosure, and will not be described in detail here.

Although implementations disclosed in the present disclosure are as the above, the described contents are only implementations used for facilitating understanding the present disclosure, and are not used to limit the present disclosure. Any person skilled in the art to which the present disclosure pertains may make any modifications and variations in the form and details of implementation without departing from the spirit and the scope of the present disclosure, but the patent protection scope of the present disclosure shall still be subject to the scope defined in the appended claims.

What is claimed is:

1. An ultrasonic induction circuit, comprising:
   an ultrasonic sensor, a first potential supply sub-circuit, a first transistor, a compensation sub-circuit, a signal output sub-circuit and a power supply sub-circuit, wherein
   the ultrasonic sensor comprises a first electrode, a second electrode and a piezoelectric film layer arranged between the first electrode and the second electrode, the first electrode being electrically connected with a first terminal of the ultrasonic induction circuit, the second electrode being electrically connected with a second terminal of the first potential supply sub-circuit, and a first terminal of the first potential supply sub-circuit being electrically connected with a first potential supply end,
   a gate of the first transistor is electrically connected with the second electrode and a second terminal of the compensation sub-circuit, a second electrode of the first transistor is electrically connected with a first terminal of the compensation sub-circuit, a first electrode of the first transistor is coupled to a second potential supply end;
   a first terminal of the signal output sub-circuit is electrically connected to the second electrode of the first transistor, and a second terminal of the signal output sub-circuit is electrically connected to a second terminal of the ultrasonic induction circuit; and a second terminal of the power supply sub-circuit is electrically connected with the first electrode of the first transistor, and a first terminal of the power supply sub-circuit is electrically connected to the second potential supply end.

2. The ultrasonic induction circuit according to claim 1, wherein the first potential supply sub-circuit comprises:

a second transistor, a second electrode of the second transistor being electrically connected to the second electrode, a first electrode of the second transistor being electrically connected to the first potential supply end, and a gate of the second transistor being electrically connected to a switch terminal of the second transistor, or a first diode, a second electrode of the first diode being electrically connected to the second electrode, a first electrode of the first diode being electrically connected to the first potential supply terminal, or a second transistor and a first diode connected in parallel, a second electrode of the second transistor and a second electrode of the first diode being electrically connected to the second electrode respectively, a first electrode of the second transistor and a first electrode of the first diode being electrically connected to the first potential supply end respectively, and a gate of the second transistor being electrically connected to a switch terminal of the second transistor.

3. The ultrasonic induction circuit according to claim 1, wherein the compensation sub-circuit comprises:

a third transistor, a first electrode of the third transistor being electrically connected with the second electrode of the first transistor, a second electrode of the third transistor being electrically connected with the gate of the first transistor, and a gate of the third transistor being electrically connected to a switch end of the third transistor, or a second diode, a first electrode of the second diode being electrically connected with the second electrode of the first transistor, and the second electrode of the second diode being electrically connected to the gate of the first transistor, or a third transistor and a second diode connected in series, a first electrode of the third transistor being electrically connected with the second electrode of the first transistor, a second electrode of the third transistor being electrically connected with a first electrode of the second diode, a second electrode of the second diode being electrically connected with the gate of the first transistor, and the gate of the third transistor being electrically connected to a switch terminal of the third transistor.

4. The ultrasonic induction circuit according to claim 1, wherein the power supply sub-circuit comprises:

a fourth transistor and a fifth transistor, a second electrode of the fourth transistor and a second electrode of the fifth transistor being electrically connected to the first electrode of the first transistor, a first electrode of the fourth transistor being electrically connected to the second potential supply end, a gate of the fourth transistor being electrically connected to a switch terminal of the fourth or a switch terminal of a third transistor, a first electrode of the fifth transistor being electrically connected to a power supply voltage terminal, and a gate of the fifth transistor being electrically connected to a switch terminal of the fifth transistor, or a fifth transistor, a second electrode of the fifth transistor being electrically connected to the first electrode of the first transistor, a first electrode of the fifth transistor being electrically connected to the second potential supply terminal of a shared port, and a gate of the fifth transistor being electrically connected to a switch terminal of the fifth transistor.

5. The ultrasonic induction circuit according to claim 1, wherein the signal output sub-circuit comprises:

a sixth transistor, a first electrode of the sixth transistor being electrically connected to the second electrode of the first transistor, a second electrode of the sixth transistor being electrically connected to the second terminal of the ultrasonic induction circuit, and a gate of the sixth transistor being electrically connected to a switch terminal of the sixth transistor.

6. A driving method for the ultrasonic induction circuit, which is performed by using the ultrasonic induction circuit according to claim 1, the driving method comprising:

supplying a first fixed potential to the second electrode of the ultrasonic sensor by the first potential supply sub-circuit, sending a preset alternating current signal via the first electrode when a voltage of the second electrode of the ultrasonic sensor is the first fixed potential to enable the ultrasonic sensor to emit ultrasonic waves;

supplying a second fixed potential to the second electrode by the first transistor and the compensation sub-circuit; and when receiving ultrasonic waves that is reflected after reaching a user's finger, converting, by the ultrasonic sensor, the received ultrasonic waves into voltage signals and outputting the voltage signals via the signal output sub-circuit.

7. The driving method for the ultrasonic induction circuit according to claim 6, wherein the magnitude of the second fixed potential is a result that a fixed potential provided by the second potential supply terminal minus a threshold voltage of the first transistor.

8. The driving method for the ultrasonic induction circuit according to claim 7, wherein a current of the voltage signals converted from the received ultrasonic waves is:

$$I = \frac{1}{2}\mu_n C_{ox} \frac{W}{L}(V_{GS} - V_{r2}),$$

wherein $\mu_n$ is a mobility of a first transistor channel, $C_{ox}$ is a capacitance of the first transistor, $$\frac{W}{L}$$

is a width-length ratio of the first transistor, $V_{GS}$ is a voltage between the gate and the second electrode of the first transistor, and $V_{r2}$ is the second fixed potential.

9. The driving method for the ultrasonic induction circuit according to claim 6, wherein supplying the first fixed potential to the second electrode of the ultrasonic sensor by the first potential supply sub-circuit comprises:

turning on the first potential supply sub-circuit, and turning off the first transistor, the compensation sub-circuit and the signal output sub-circuit, to supply the first fixed potential to the second electrode via the first potential supply terminal that is electrically connected with the first potential supply sub-circuit.

10. The driving method for the ultrasonic induction circuit according to claim 6, wherein supplying the second fixed potential to the second electrode by the first transistor and the compensation sub-circuit comprises:

turning on the first transistor and the compensation sub-circuit, and turning off the first potential supply sub-circuit and the signal output sub-circuit, to supply the second fixed potential to the second electrode via the second potential supply terminal that is electrically connected with the first transistor.

11. The driving method for the ultrasonic induction circuit according to claim 6, wherein receiving ultrasonic waves that is reflected after reaching the user's finger by the ultrasonic sensor comprises:

sampling the received ultrasonic waves after increasing the second fixed potential to a third fixed potential through the first transistor and the compensation sub-circuit, and after finishing the sampling, decreasing the third fixed potential to a fourth fixed potential, the fourth fixed potential being a static working potential of the first transistor.

12. The driving method for the ultrasonic induction circuit according to claim 6, wherein converting, by the ultrasonic sensor, the received ultrasonic waves into voltage signals and outputting the voltage signals via the signal output sub-circuit comprises:

converting the received ultrasonic waves into the voltage signals after the received ultrasonic waves passing through the piezoelectric film layer of the ultrasonic sensor, and turning on the signal output sub-circuit and the first transistor, turning off the first potential supply sub-circuit and the compensation sub-circuit, and outputting, through the first transistor and the signal output sub-circuit, voltage signals reaching the gate of the first transistor.

13. A computer readable storage medium, storing executable instructions, when the executable instructions are executed by a processor, the driving method for the ultrasonic induction circuit according to claim 6 is implemented.

14. A display device, comprising a display panel, and the ultrasonic induction circuits according to claim 1 arranged in an array.

15. The display device according to claim 14, wherein the ultrasonic sensor of the ultrasonic induction circuit is disposed on a backplane attached to the display panel, a side of the backplane away from the display panel being sequentially provided with the second electrode, the piezoelectric film layer and the first electrode arranged in an array.

* * * * *